United States Patent
Rahman et al.

(10) Patent No.: US 10,715,482 B2
(45) Date of Patent: Jul. 14, 2020

(54) WIDE AREA SERVICE DISCOVERY FOR INTERNET OF THINGS

(71) Applicant: Convida Wireless, LLC, Wilmington, DE (US)

(72) Inventors: Shamim Akbar Rahman, Cote St. Luc (CA); Chonggang Wang, Princeton, NJ (US); Lijun Dong, San Diego, CA (US); Quang Ly, North Wales, PA (US); Guang Lu, Thornhill (CA); Xu Li, Plainsboro, NJ (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 240 days.

(21) Appl. No.: 15/741,395

(22) PCT Filed: Jul. 6, 2016

(86) PCT No.: PCT/US2016/041029
§ 371 (c)(1),
(2) Date: Jan. 2, 2018

(87) PCT Pub. No.: WO2017/007783
PCT Pub. Date: Jan. 12, 2017

(65) Prior Publication Data
US 2018/0191666 A1    Jul. 5, 2018

Related U.S. Application Data

(60) Provisional application No. 62/188,781, filed on Jul. 6, 2015.

(51) Int. Cl.
*H04L 29/12* (2006.01)
*H04L 29/08* (2006.01)

(52) U.S. Cl.
CPC ...... *H04L 61/1541* (2013.01); *H04L 61/1511* (2013.01); *H04L 67/16* (2013.01); *H04L 61/6013* (2013.01)

(58) Field of Classification Search
CPC ............ H04L 61/1511; H04L 61/1541; H04L 61/6013; H04L 67/16
See application file for complete search history.

(56) References Cited

U.S. PATENT DOCUMENTS

| 2013/0205018 A1* | 8/2013 | Rahman ................ H04L 67/16 709/224 |
| 2014/0010150 A1* | 1/2014 | Agarwal ............... H04L 67/18 370/328 |

(Continued)

FOREIGN PATENT DOCUMENTS

| JP | 2001-057572 A | 2/2001 |
| JP | 2008-301024 A | 12/2008 |

(Continued)

OTHER PUBLICATIONS

RFC 7252 The Constrained Application Protocol (CoAP)—Shelby et al Jun. 2014 (Year: 2014).*

(Continued)

*Primary Examiner* — June Y Sison
(74) *Attorney, Agent, or Firm* — BakerHostetler

(57) ABSTRACT

A cloud-based DNS-SD architecture may link together separate LANs to form a virtual discovery zone from a service discovery perspective that includes a cloud based DNS-SD server separate from regular Internet DNS, and asleep node handling, among other things. In an example, a cloud based DNS-SD server is separate from the regular Internet DNS servers. This cloud DNS-SD server may run as a private Infrastructure as a Service (IaaS) specifically for service discovery in the virtual discovery zone.

20 Claims, 18 Drawing Sheets

(56) References Cited

U.S. PATENT DOCUMENTS

| | | | |
|---|---|---|---|
| 2014/0089478 A1* | 3/2014 | Seed | H04W 4/70 709/222 |
| 2014/0214958 A1* | 7/2014 | Cheshire | H04L 61/1511 709/204 |
| 2014/0269703 A1 | 9/2014 | Sundaresan et al. | |
| 2014/0337526 A1 | 11/2014 | Amishav et al. | |
| 2014/0362724 A1 | 12/2014 | Bertz et al. | |

FOREIGN PATENT DOCUMENTS

| | | |
|---|---|---|
| JP | 2015-046716 | 12/2015 |
| WO | 2014/166522 A1 | 10/2014 |
| WO | 2014/186733 A1 | 11/2014 |

OTHER PUBLICATIONS

CoRE Resource Directory—Shelby et al Jun. 2015 (Year: 2015).*
RFC 7390 Group Communication for the Constrained Application Protocol (CoAP)—Rahman et al Oct. 2014 (Year: 2014).*
Wikipedia "Cloud Computing—Infrastructure as a Service (IaaS)" https://en.wikipedia.org/wiki/Cloud_computing, Retrieved Apr. 30, 2019, 19 pages.
Stolikj et al., "Proxy Support for Service Discovery Using mDNS/DNS-SD in Low Power Networks", Proceeding of IEEE International Symposium on a World of Wireless, Mobile and Multimedia Networks 2014, IEEE, Jun. 19, 2014, 6pages.
Shelby et al., "CoRE Resource Directory draft-ietf-core-resource-directory-02" Internet-Draft: Standards Track, Nov. 9, 2014, 37 pages.
Shelby et al., "Constrained RESTful Environments (CoRE) Link Format" Internet Engineering Task Force (IETF) RFC: 6690, Aug. 2012, 22 pages.
Mockapetris et al., "Domain Names—Implementation and Specification" Network Working Group RFC: 1035, Nov. 1987, 55 pages.
Mockapetris et al., "Domain Names—Concepts and Facilities" Network Working Group RFC: 1034, Nov. 1987, 55 pages.
Commons, "Domain Name Space" http://commons.wikimedia.org/wiki/File:Domain-name_space.svg, Retrieved on Apr. 30, 2019, 5 pages.
Cheshire et al., "Requirements for a Protocol to Replace the AppleTalk Name Binding Protocol (NBP)" Internet Engineering Task Force (IETF), RFC: 6760, Feb. 2013, 16 pages.
Cheshire et al., "Multicast DNS" Internet Engineering Task Force (IETF) RFC: 6762, Feb. 2013, 70 pages.
Cheshire et al., "Hybrid Unicast/Multicast DNS-Based Service Discovery draft-ietf-dnssd-hybrid-00" Internet Engineering Task Force: Standards Track, Nov. 10, 2014, 19 pages.
Cheshire et al., "DNS-Based Service Discovery" Internet Engineering Task Force (IETF) RFC 6763, Feb. 2013, 49 pages.
"Service Name and Transport Protocol Port Number Registry" http://www.iana.org/assignments/service/names-port-numbers/service-names-port-numbers.xhtml, Retrieved Apr. 30, 2019, 243 pages.
"Extensions for Scalable DNS Service Discovery (dnssd)" https://datatracker.iet.org/assignments/service-names-port-numbers/service-names-port-nmbers.xhtml, Retrieved Apr. 30, 2019, 6 pages.
"Domain Name System" http://en.wikipedia.org/wiki/Domain_Name_System, retrieved Apr. 30, 2019, 19 pages.
"Domain Name System (DNS) Parameters", www.iana.org/assignments/dns-parameters/dns-parameters.txt, Retrieved Apr. 30, 2019, 8 pages.

* cited by examiner

WIDE AREA SERVICE DISCOVERY FOR INTERNET OF THINGS

CROSS-REFERENCE TO RELATED APPLICATIONS

This Application is a National Stage Application filed under 35 U.S.C. § 371 of International Application No. PCT/US2016/041029, filed Jul. 6, 2016, which claims the benefit of U.S. Provisional Patent Application No. 62/188,781, filed Jul. 6, 2015, entitled "Wide Area Service Discovery for Internet Of Things", the contents of which are hereby incorporated by reference herein.

BACKGROUND

Domain Name System

The Domain Name System (DNS) is a distributed database of information about devices (also called hosts) connected to the Internet. Specifically, DNS contains information to map between human readable names (used as a mnemonic device) and IP addresses (used in Internet routing):

Example 1: Web site name "www.google.com" maps to IP address "74.125.224.72"

Example 2: Email address "john.smith@bestcompany.com" maps to IP address "208.49.79.242"

This information is stored in DNS database entries which are referred to as DNS Resource Records (RRs). DNS servers respond to client queries by giving information about Internet connected devices (hosts) stored in the DNS records. The most common query is translating a name to an IP address. This function is termed DNS name resolution. Technically, the name that is resolved is referred to as an FQDN. There are also other types of possible DNS queries which will be discussed herein.

A semi-manual scheme for DNS worked initially, but did not scale well when the number of hosts connected to the Internet started growing exponentially. An investigation was then made to determine a more automatic and scalable solution which resulted in a key series of IETF standards defining DNS. See RFC 1034 and RFC 1035, which are incorporated by reference in their entirety.

DNS today is a distributed database spread over many computer servers located worldwide. The database is organized around the concept of domain names (e.g., ".com" is part of a domain name, and "www.bestcompany.com" is a FQDN). Each domain name is essentially a path in a large inverted tree, called the domain namespace (see FIG. 1). A domain is a sub-tree of the entire space. The tree structure has a single (logical) root at the top. The depth of the tree is limited to 127 levels. Each node in the tree has a text label name that can be up to 63 characters long. Domain names are always read from the leaf node toward the root with dots separating the names in the path. So, for example for the FQDN "www.bestcompany.com", the ".com" would be at the top of the tree and is referred to as the Top Level Domain (TLD). Then ".bestcompany" would be next down the tree, and "www" would be at the bottom leaf of the tree.

As mentioned previously, DNS database entries are stored in a format called RRs. The RRs are organized by domains or specific domain names (FQDNs). FQDNS are ultimately associated with a physical network device, while domains (e.g., ".com") are used to identify a group of devices. There are various types of RRs classified by the type of information related to the device that they contain. Some exemplary DNS RRs are listed in Table 1.

TABLE 1

Types of DNS Resource Records (RRs)

| Type of RR | Name | Description |
| --- | --- | --- |
| A | Address Record | The IPv4 address of the host (device) for the given FQDN |
| AAAA | IPv6 Address Record | The IPv6 address of the host (device) for the given FQDN |
| MX | Mail Exchange Record | The E-Mail Exchange server for a given domain |
| NS | Name Server Record | The authoritative DNS name server for the given domain |
| PTR | Pointer Record | A pointer to another part of the DNS name space (Often used to map an IP address to a host name) |
| SRV | Service Locator Record | A generalized service location record that gives the FQDN and port number of servers for the specified service (This is used for newer protocols instead of creating protocol-specific records such as MX (used for E-Mail)). |
| TXT | Text Record | Text string that can be interpreted as required by different protocols |

DNS queries and responses are typically sent directly over UDP packets on port 53. A TCP transport option also exists but is not the recommended option for DNS queries/responses which are typically fairly short transactions. DNS defines a single message format with three components as shown in FIG. 2.

The three components are header portion 105, question portion 107, and answer portion 109. With regard to header portion 105, there is fixed twelve byte header with fields that describe the type of message and the size of the variable portions. Question portion 107 contains one or more queries for information being sent to a DNS name server. Answer Portion 109 contains one or more RRs in three sub-components as an answer to the query/question in question portion 107, such as answer 111, authority 112, and additional 113. Answer 111 is a RR(s) that answers the question directly. Authority 112 is a RR(s) that points to authoritative DNS name servers that can be used to continue the resolution process. Additional 113 is a RR(s) that contains additional information related to the query that is not strictly necessary to answer the original question.

FIG. 3 illustrates a typical message sequence diagram for a DNS lookup initiated by a user doing web browsing. At step 121, a user at laptop 130 wants to read the latest Google business news. This information is entered through a user interface associated with browser 131 of laptop 130. Browser 131 then recognizes that it needs to get the IP address of "google.com." So browser 131 contacts DNS client 132 in laptop 130 with this request. At step 122, once DNS Client 131 gets the request, it forms a DNS Message query with FQDN="google.com". This query is sent to default DNS server 133 over Internet 120. The IP address of DNS server 133 may be already available in DNS client 132. The IP address of DNS server 133 may have been pre-provisioned in the laptop or retrieved at the laptop boot up process by a protocol such as DHCP.

At step 123, DNS server 133 does an internal lookup on the received query of step 122 and determines that the server of the ".com" domain is DNS server 134. So a DNS message (containing the RR) is sent back to DNS client 132 to inform it that it should do a recursive search and contact DNS server 134 with the same query. At step 124, DNS client sends DNS message with similar information of step 122 to DNS server 134. In this example, DNS server 134 is the authoritative domain server and so no further recursion is necessary. At step 125, DNS server 125 will sends a DNS message with a response to step 124 containing the "A" RR which contains the IP address (74.125.224.72) of the requested "google.com" server. At step 126, DNS client 132 sends the "google.com" IP address from the DNS Message to the browser 131. At step 127, browser 131 sends an HTTP Get request directly to the "google.com" IP address (74.125.224.72) to retrieve the content that it wants, which may be the latest business news. At step 128, the "google.com" server responds with an HTTP response with the appropriate latest business news content.

DNS-SD

DNS-Service Discovery (DNS-SD) is a relatively new feature that has been added to DNS in recent years. DNS-SD refers to the use of DNS to discover available local network IP based services in addition to the usual name resolution function. For example, querying DNS-SD for available printers in the local network that can be accessed via IP. Specifically, given a type of service (e.g., printing) that a client is looking for this mechanism allows clients to discover a local list of devices (named instances) of that desired service, in a given domain, using standard DNS-queries. The commercial pre-cursor to the IETF standardized solution was by Apple Computer and was referred to as "AppleTalk" (sometimes also referred to as "Bonjour"). See RFC 676, which is incorporated by reference in its entirety.

In IETF, an IP "service" is recognized by a combination of three pieces of information that includes a service name (e.g., FTP, HTTP), a transport protocol (e.g., UDP, TCP), and a port number of the transport protocol. An extensive registry of known Internet IP services is maintained by IETF in a service name and transport protocol port number registry. See http://www.iana.org/assignments/servicenames-port-numbers/service-names-port-numbers.xhtml, which is incorporated by reference in its entirety.

Technically, DNS-SD is composed of two functions. The first function is referred to as multicast DNS (mDNS). mDNS provides the ability to perform local network DNS operations in the absence of any conventional unicast DNS server by utilizing local IP multicast functionality. Thus, devices can directly answer local IP multicast DNS queries themselves instead of requiring dedicated DNS servers to respond to the query (e.g., a printer will directly answer multicast DNS queries looking for printing services). mDNS also allows devices to pro-actively advertise their supported/ changed services using link-local multicast. In addition, mDNS designates a portion of the DNS namespace to be free for local use (e.g., a new ".local" domain), without the need to pay any annual fee, and without the need to set up delegations or otherwise configure a conventional DNS server to answer for those names. See RFC 6762, which is incorporated by reference in its entirety.

The second function is itself (a bit confusingly) called DNS-SD. It is described in RFC 6763 (which is incorporated by reference in its entirety) and specifies the changes required within the DNS record structure to support service discovery queries (e.g., configuring DNS to support more than the classical name resolution queries). It can also be used in a pure unicast mode for querying for specific services of a given domain. However, this unicast mode is not used as general service discovery function today.

The combination of DNS-SD and mDNS is typically referred to as just "DNS-SD" when used in the context of dynamic multicast service discovery in a network. The discovery of services is done as needed directly by clients sending multicast queries and receiving (unicast) responses directly from the devices that support the requested IP based services. This service discovery works for local networks (e.g., cannot discover services dynamically across multiple LANs).

FIG. 4 illustrates a typical DNS-SD message flow. At step 141, a user wants to print a color document from word processor 136. Word processor 136 recognizes that it needs to get the IP address of a color printer (e.g., color printer 139). So word processor 136 sends a message to DNS client 132 in laptop 130 with this request. At step 142, once DNS client 132 gets the request it determines that it should form a DNS-SD (multicast) message query indicating that it is looking for a "Color Printer". This query is sent by IP multicast over LAN 140 that laptop 130 is connected with. The IP multicast mechanism will automatically distribute the DNS-SD query to all devices connected to LAN 140 (the message should not go beyond LAN 140). Unlike standard DNS queries (which are sent over UDP port 53), a multicast DNS-SD query is sent over UDP port 5353. Also, a multicast DNS-SD domain is specified as having an FQDN that ends with ".local" suffix, such as "ColorPrinter.local".

At step 143, multiple devices in LAN 140 receive the DNS-SD multicast query, but, here, only color printer 139 has a matching service type. Color printer 139 sends a DNS-SD message (unicast) response including the IP address (e.g., 192.168.0.11) of the requested service server. At step 144, DNS client 132 of laptop 130 sends the IP address of color printer 139 to word processor 136. At step 145, word processor 136 sends an HTTP Post request directly to the IP address of color printer 139 to request that the attachment is printed. At step 146, color printer 139 responds with a successful HTTP response code (201) to indicate that the attachment was successfully printed.

As mentioned previously DNS-SD is primarily used to discover IP based services in the local network. DNS-SD uses a combination of three standard DNS RRs to identify services which usually includes Pointer Record (PTR), Service Locator Record (SRV), and Text Record (TXT). DNS-SD searches involve a client sending a DNS query that specifies in the search parameters to look for a particular service type in the PTR records for a given domain. The DNS-SD servers then return a set of zero or more SRV/TXT pairs that gives the target device (host) name and port where the service instance can be reached (in the SRV RR) as well as ancillary information (in the TXT RR). The IP address of the target device can then be obtained from the associated "A" or "AAAA" record.

Hybrid DNS-SD Proxy

A recent draft hybrid unicast/multicast DNS-based service discovery proposes utilizing a hybrid proxy to allow selective wide area discovery of IP based services. See http://tools.ietf.org/html/draft-ietf-dnssd-hybrid-00, which is incorporated by reference in its entirety. Specifically, the draft proposes a proxy that will use mDNS to discover DNS-SD services in the local network, aggregate the responses, and answer back to a requesting client in a different LAN. This will also require key changes to the naming system in DNS (which is fairly controversial and has not yet been agreed to in IETF). Currently, the DNS domain names are ultimately associated with a given device as described previously. If the hybrid unicast/multicast DNS-based service draft is approved then it will allow a LAN (e.g., local link), instead of individual devices, to be also named (e.g., "4thFloor.Building1.companyX.com") so that it can be queried to search for a given service.

FIG. 5 illustrates an exemplary flow for a hybrid DNS-SD Proxy scenario. At step 151, a query is required to be sent to a specific "named" LAN (e.g., 3$^{rd}$ floor of BestCompany) to search for a color printer. At steps 152-154, the normal (unicast) DNS query mechanism will result in the query being forwarded to the DNS-SD proxy 150 for the given LAN 140 (e.g., 3$^{rd}$ floor of BestCompany). At steps 155-156, DNS-SD proxy 150 triggers an mDNS request. The devices in LAN 140 receive the DNS-SD multicast query, but only color printer 139, which has a matching service type (of Color Printer), will answer. Color printer 139 sends a DNS-SD message (unicast) response including the IP address of the requested service server. At steps 157-158, the DNS response with the IP address is relayed back to word processor 136. At step 159, word processor 136 then sends an HTTP Post request directly to the IP address of color printer 139 to request that the attachment is printed.

DNS-SD can currently discover and advertise IP based services (e.g., printer, fax, etc.) in the local network, but there is a need for a system that works across LANs.

SUMMARY

Disclosed herein is a cloud based DNS-SD architecture that links together separate LANs to form a virtual discovery zone from a service discovery perspective that includes a cloud based DNS-SD server separate from regular Internet DNS, and asleep node handling, among other things. In an example, a cloud based DNS-SD server is separate from the regular Internet DNS servers. This cloud DNS-SD server may run as a private Infrastructure as a Service (IaaS) specifically for service discovery in the virtual discovery zone.

IoT devices and IoT gateways handle DNS-SD queries and responses (e.g. for sleepy node handling), and also distinguish from other types of DNS queries (e.g. standard DNS name resolution queries). Procedures define and configure virtual discovery zones and controlling nodes (e.g., DSN-SD server, IoT gateways). In an example, configuration may occur via OAM procedures at the various controlling nodes. In another example, configuration may occur via a dynamic network self-configuring approach based on signaling between the controlling nodes. A user interface may graphically display the virtual discovery zones.

A method, system, computer readable storage medium, or apparatus has means for receiving from a first LAN a DNS-SD query for a service; and responsive to receiving the DNS-SD query, providing information about the service, the service on a second LAN.

A method, system, computer readable storage medium, or apparatus has means for providing a request to a service; and receiving a response to the request, the response comprising sleep node information about a device associated with the service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
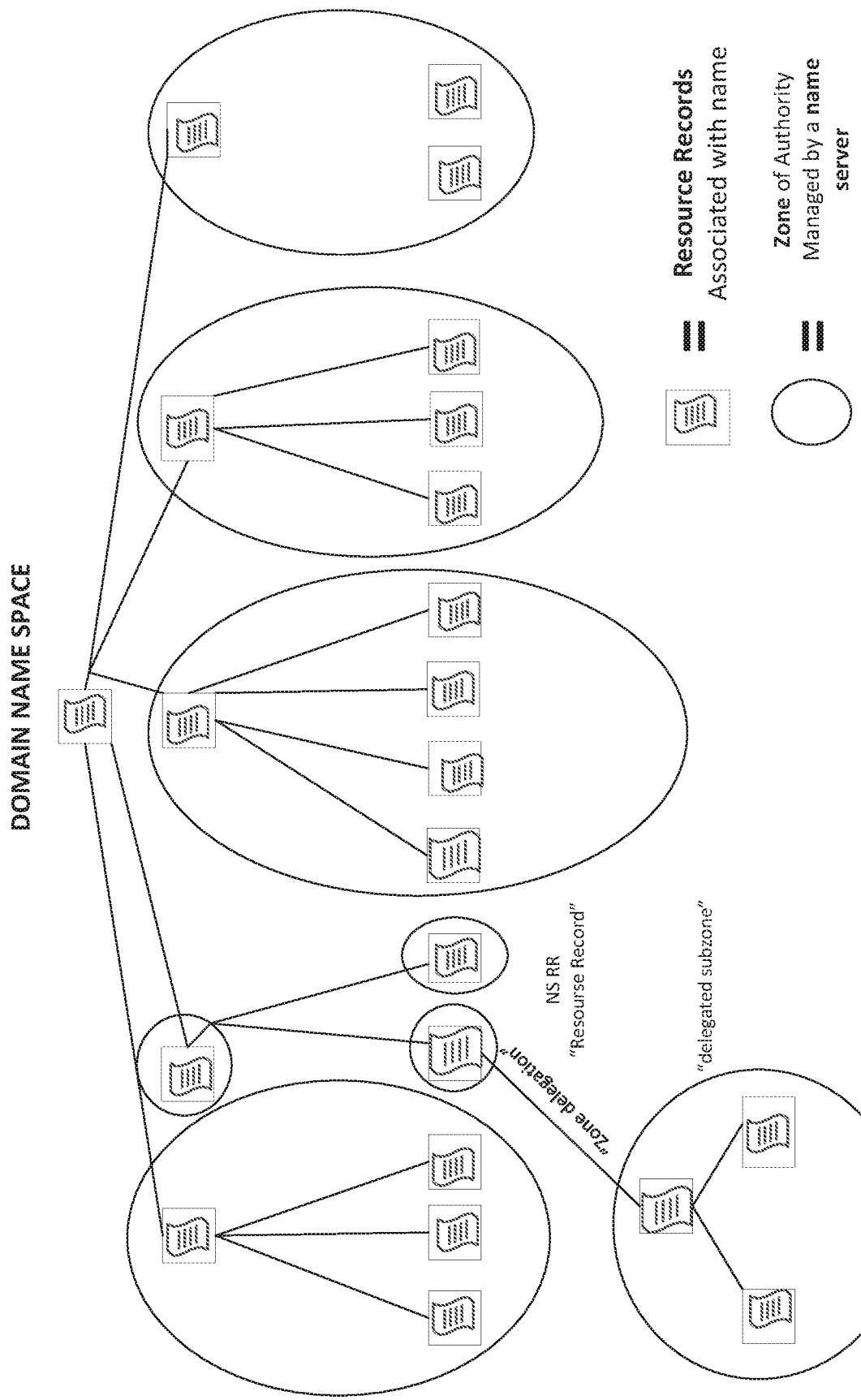
FIG. 1 illustrates an exemplary DNS database structure.
Figure 2:
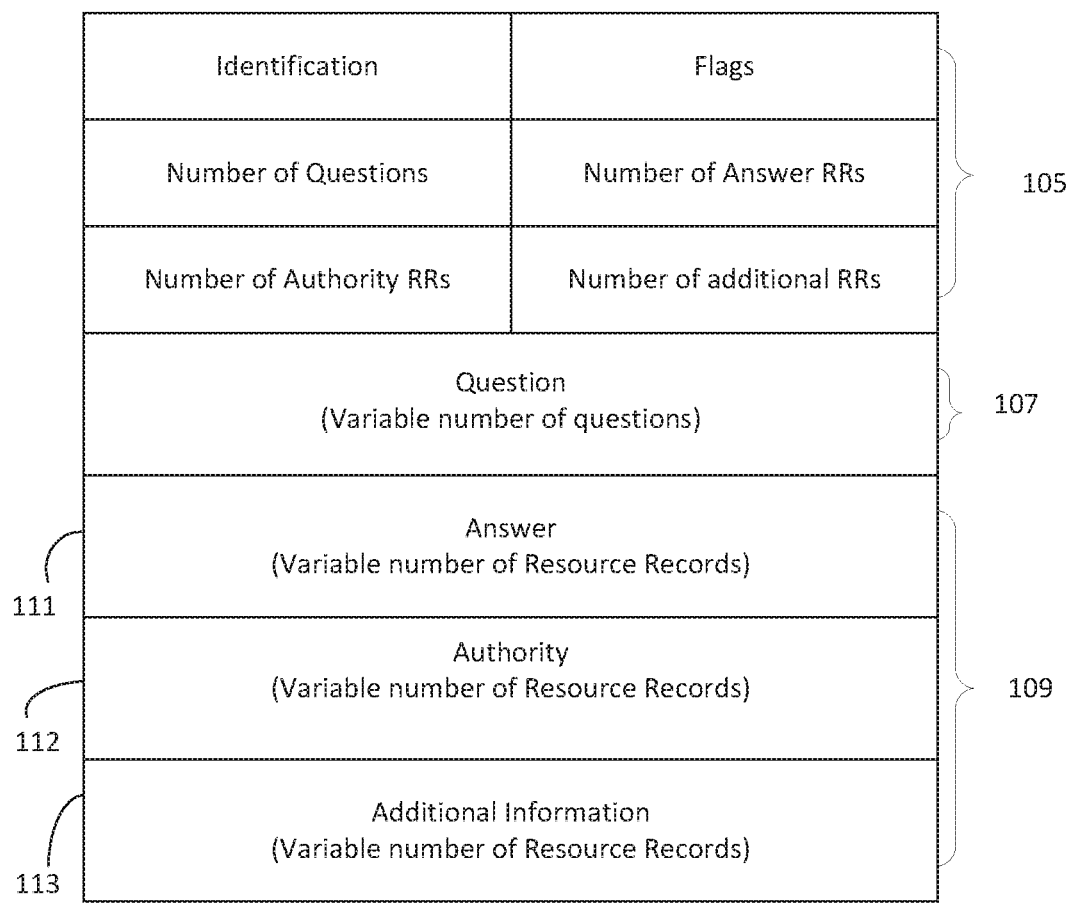
FIG. 2 illustrates an exemplary single message DNS format with three components.
Figure 3:
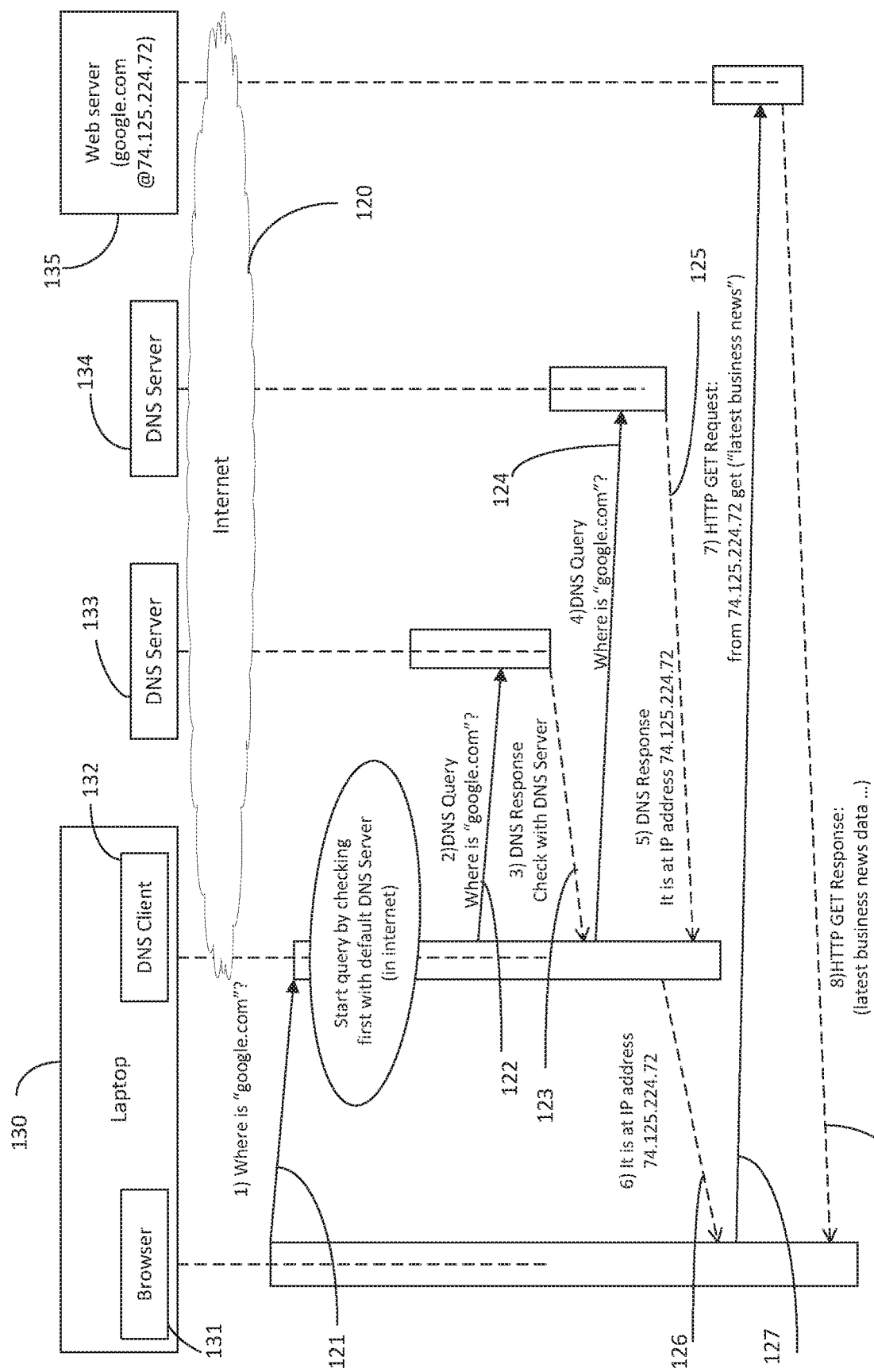
FIG. 3 illustrates an exemplary message sequence diagram for a DNS lookup initiated by a user doing web browsing.
Figure 4:
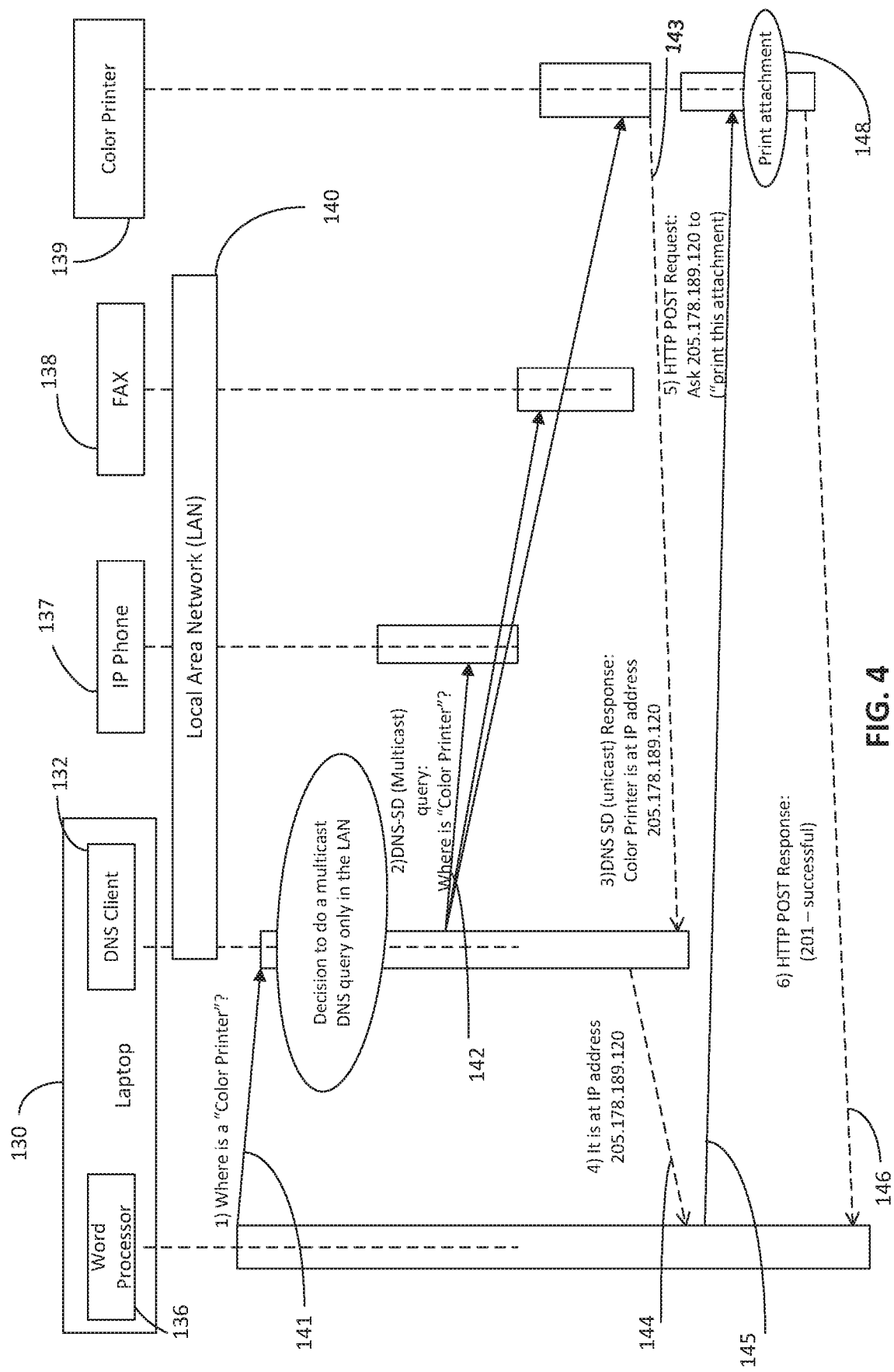
FIG. 4 illustrates an exemplary DNS-SD message flow.
Figure 5:
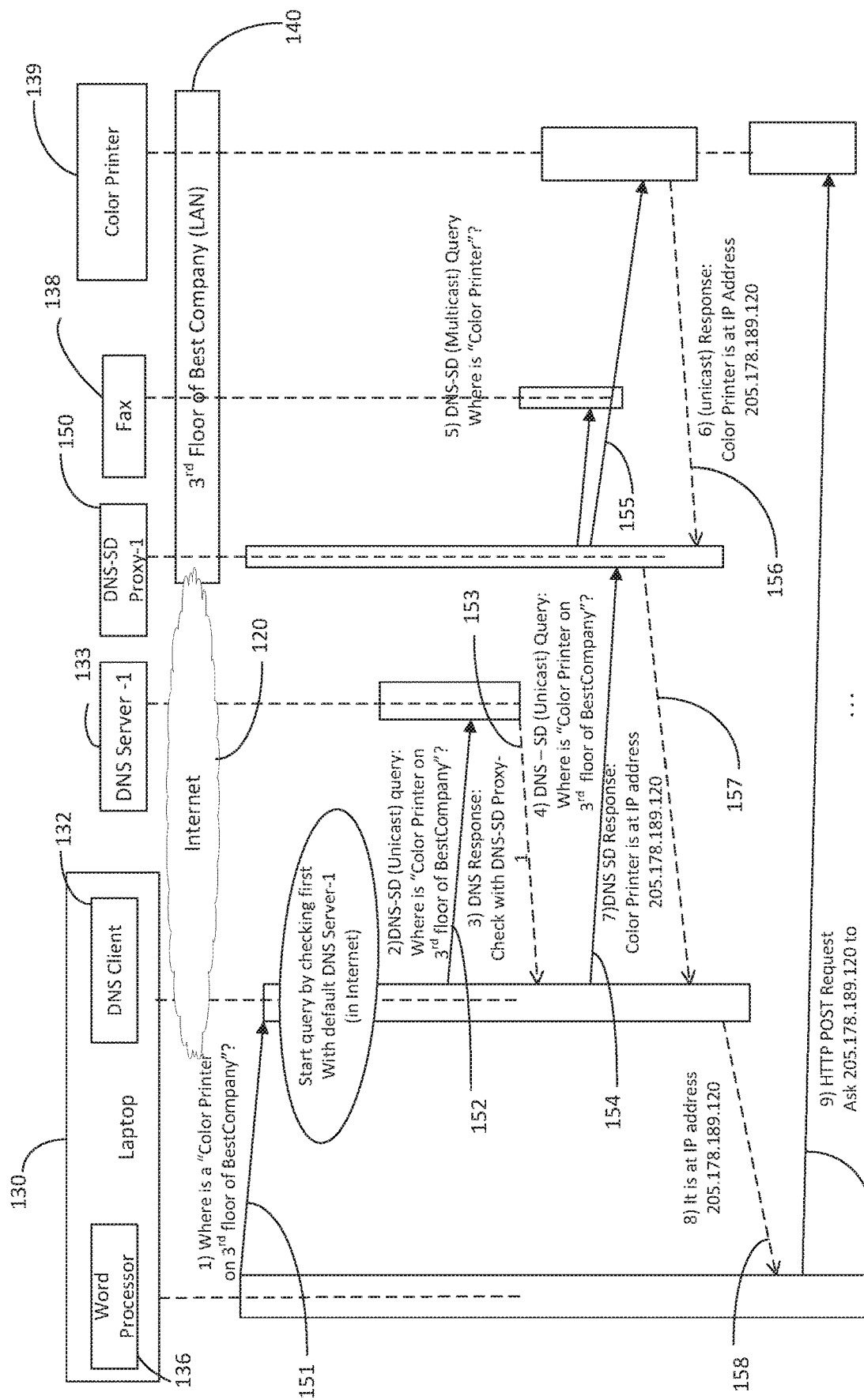
FIG. 5 illustrates an exemplary flow for a hybrid DNS-SD Proxy scenario.

Disclosed herein is a DNS service discovery (DNS-SD) that works beyond the local network for IoT scenarios. DNS-SD can currently discover and advertise IP based services (e.g., printer, fax, etc.) in the local network, but it does not work across LANs. However, in many IoT scenarios this is not sufficient. An example of a service name would be "Temperature Sensor" or "Light switch" or "Door Lock". Also other services are discussed herein with regard to a transport protocol (e.g. UDP for IoT services using CoAP) and port number (e.g. default UDP CoAP port is 5683) as stated in RFC 7252.

Discussed below are some restrictions or limitations of conventional DNS-SD technology. Conventional DNS-SD supports a strictly unicast method of querying DNS servers directly to search for services (e.g., with mDNS not required) and can work across LANs. This unicast approach however is not considered a general purpose service discovery approach for multiple reasons. A first reason deals with issues associated with how a client searching for a given service can determine which domain to search. For unicast you need to know which domain to search. The brute force approach of searching many or all domains would result in too much signaling and more importantly potentially significant delay in finding the service. The simplistic approach of searching the "current" domain may result in missed opportunities if the service is not registered there.

A second reason deals with issues associated with how devices can automatically update the DNS servers with information about their supported services. Updating of DNS RRs requires a fairly complex security association between the client and the DNS server it is updating. This strong security association is often not possible with simple, off the shelf devices, such as printers, IoT devices, etc., because it may require for example manual configuration of security credentials. It is not considered practical in many cases for a human operator to manually input all of this information into the DNS servers due to the scale and expected dynamic nature of services and devices.

Conventional DNS-SD supports an mDNS method for querying servers. mDNS associated with conventional DNS-SD may be considered as working well for service discovery within a local link, but is explicitly constrained not to work outside the local link. A reason for this constraint is that the mDNS function is allocated for only local link IP multicast addresses by IETF (see section 22 of RFC 6763). Generally, multicasting beyond the LAN for service discovery is expected to cause significant network congestion in many scenarios and thus is expressly forbidden by IETF. As discussed herein, a local link typically equates to a LAN or a subsection of a LAN. The link is typically a shared transmission medium such as Ethernet or WiFi with multiple devices connected to it. Often the link translates to a single layer 2 (broadcast) domain (but may be extended by L2 devices like bridges). Typically a local link is does not require a layer 3 IP router for relaying packets. In this document, for simplicity, the term "LAN" or "local network" is used interchangeably with the term "local link".

IoT is the term coined to describe the evolution of current mainly proprietary M2M systems to the point where they can be fully integrated into the overall Internet using standardized protocols. Disclosed herein is an approach (wide area service discovery) that uses DNS-SD so that it works beyond the local network for IoT scenarios. In many IoT scenarios that require discovery beyond the local network, the current DNS-SD is not sufficient. For example, if a smart grid (e.g., networked electrical utility) operator deploys IoT devices across a city then the operator would like a common discovery of services across his entire deployment (e.g., across multiple LANs) which is a need that cannot be met so far.

IETF documents titled "Extensions for Scalable DNS SD—Charter for WG" explicitly specifies this problem, reciting "[t]he DNS-SD/mDNS protocol suite is used in many scenarios including home, campus, and enterprise networks. However, the zero configuration mDNS protocol is constrained to link-local multicast scope by design, and therefore cannot be used to discover services on remote links." See http://datatracker.ietf.org/wg/dnssd/charter, which is incorporated by reference in its entirety.

Hybrid DNS-SD proxy, which tries to address the aforementioned issues, has drawbacks that includes initiating frequent mDNS multicast traffic on demand (e.g., at time of DNS-SD query). Frequent multicast does not scale well for IoT environments because there are more devices or more networks to reach which causes higher overhead traffic. Also, many of the IoT devices may often be sleeping and so may miss many of the multicast DNS-SD queries. Also, hybrid DNS-SD proxy does not leverage IoT specific architectures (e.g., RD) and IoT specific protocols (e.g., CoAP) which are optimized for IoT deployments and accordingly causes higher overhead and inefficiency compared to these IoT specific nodes and protocols.

Therefore, the conventional DNS-SD service discovery approach may be significantly altered to support a more efficient mechanism that enables service discovery (DNS-SD) across multiple LANs which have some logical relationship with each other (e.g., wide area service discovery within some limits).

The wide area service discovery discussed herein may leverage a resource directory (RD). The (RD) is a server that hosts descriptions of resources (e.g., URIs) held on other servers for IoT environments. See CoRE resource directory http://tools.ietf.org/html/draft-ietf-core-resource-directory-02 (herein after CoRE Resource Directory), which is incorporated by reference in its entirety. The resource directory allows centralized lookups to be performed for those resources. The presumption being that normal Google type web searches would not work efficiently in IoT environments. Instead, the RD supports a RESTful CoAP interface to allow devices to register their resources as well as relevant metadata. Also, relationships between a device's resources may be stored. A separate RESTful interface allows a third party client to search the RD to find (discover) resources that satisfy its given search criteria. The third party client can then directly go to the resource (URI) once it has been provided the search result by the RD.

The CoRE Resource Directory defines a simple mapping of RD fields and conventional DNS-SD fields that permits discovery of CoAP services by either means. Specifically, it proposes that a special client can first do a standard RD lookup of CoAP services from RD. The client can then take the response and do a unicast registration of the information in conventional DNS-SD. As noted above this requires a client that is able to establish a complex security association with the DNS infrastructure. So the client cannot be a simple IoT device but would most likely be a special purpose management configuration client.

Figure 6:
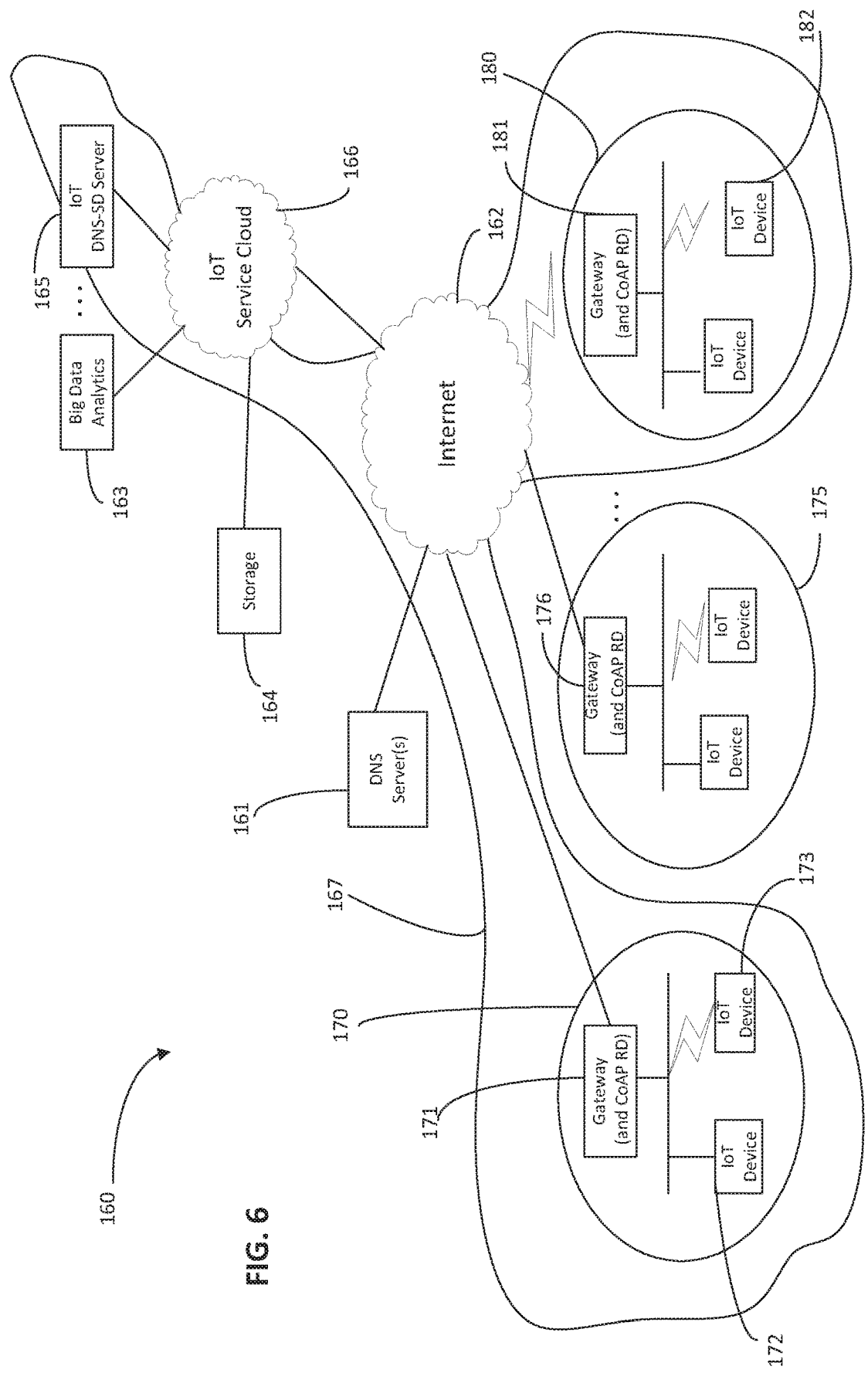
FIG. 6 illustrates an exemplary wide area service discovery system.

FIG. 6 illustrates an exemplary wide area service discovery system 160. LAN 170, LAN 175, and LAN 180 include, respectively, gateway 171, gateway 176, and gateway 181. Each LAN, such as LAN 170, may include IoT devices (e.g., IoT device 172) locally communicatively connected with a gateway (e.g., gateway 171), and a gateway communicatively connected with Internet 162. Gateways, such as gateway 171, in wide area service discovery system 160 may support CoAP RD or the like functionality. Internet 162 is communicatively connected with DNS server 161 and IoT service cloud 166. IoT service cloud 166 may include big data analytics 163, storage 164, and IoT DNS-SD server 165, among other services. IoT devices in the various LANs of system 160 may have owners or operators (e.g., a business, a utility, etc.) that may cooperate in a virtual discovery process managed by a 3rd party IoT device service discovery server (e.g., IoT DNS-SD server 165). Standard DNS name resolution may still be done by the existing ("regular") DNS infrastructure of Internet 162. LAN 170 and LAN 180 are within the same virtual discovery zone 167.

As discussed in more detail herein, DNS-SD queries may be done in a two-step process. First an attempt is made to discover service locally within the same LAN. If this is not successful, the query can be routed to IoT DNS-SD server 165. This cloud based IoT DNS-SD server 165 can respond to service discovery queries for IoT devices in virtual discovery zone 167.

As discussed herein, wide area service discovery system 160 enables virtual discovery zones established beyond a LAN. In this example, LAN 170 and LAN 180 are two physically separate (non-contiguous) LANs that are stitched together into virtual discovery zone 167. In virtual discovery zone 167, service discovery may be enabled over all the devices in the entire zone. The zone may be of an arbitrary size and encompass as many LANs as required. Also, only one virtual discovery zone 167 is shown in FIG. 6, but there can (and usually will) be multiple virtual discovery zones defined. For example, although not shown, LAN 175 and LAN 180 may be in a separate virtual discovery zone.

With continued reference to FIG. 6, services are not exposed for discovery outside of the given IoT virtual discovery zone 167. Virtual discovery zones may be both overlapping and non-overlapping. Therefore, a service that is part of two overlapping zones may be discoverable in each of those zones. In another example, a given virtual discovery zone may encompass multiple classical mDNS domains. A classical mDNS domain is a single subnet or LAN. A given virtual discovery zone typically will encompass multiple LANs.

Figure 15A:
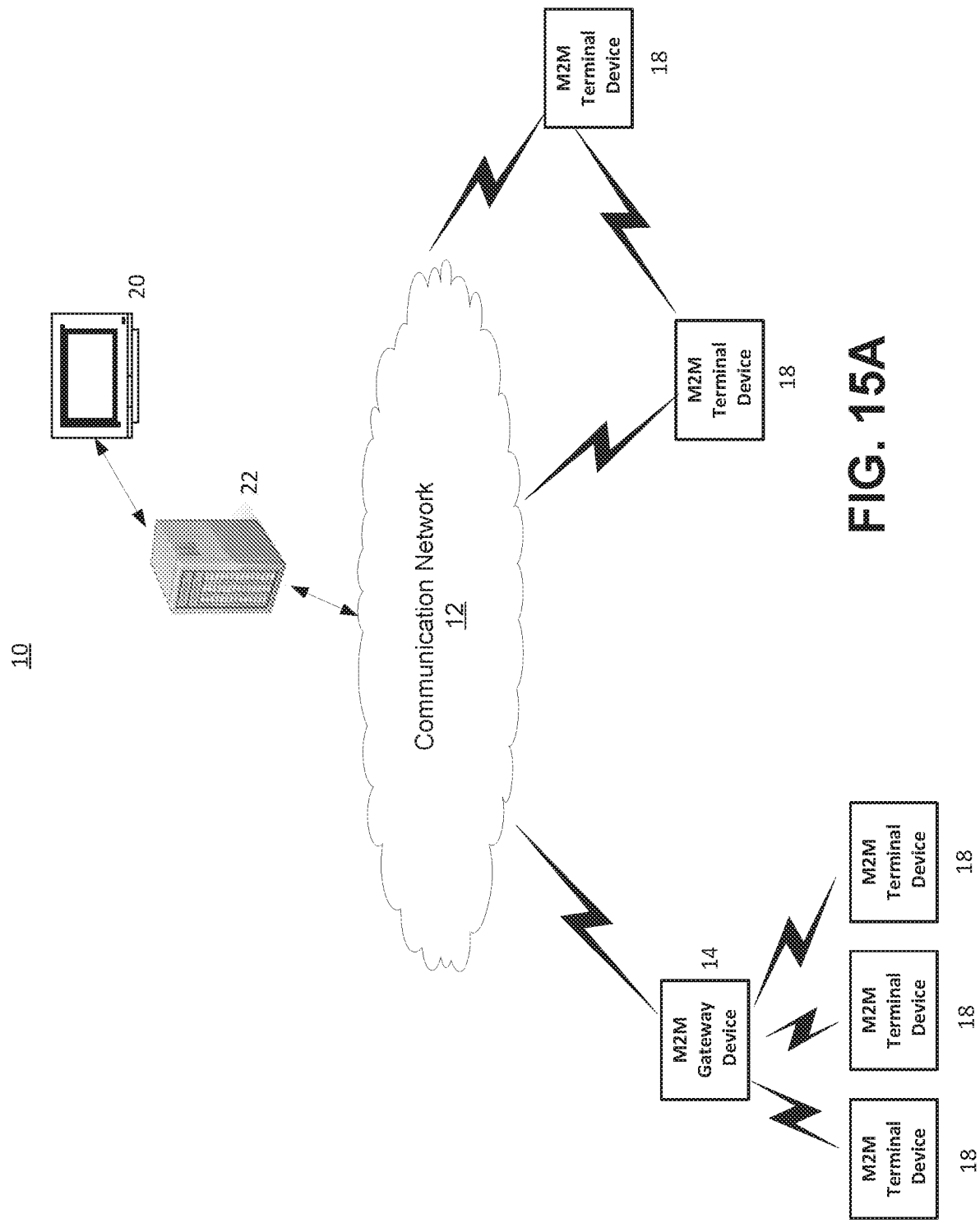
FIG. 15A is a system diagram of an example machine-to-machine (M2M) or Internet of Things (IoT) communication system in which the disclosed subject matter may be implemented.
Figure 15B:
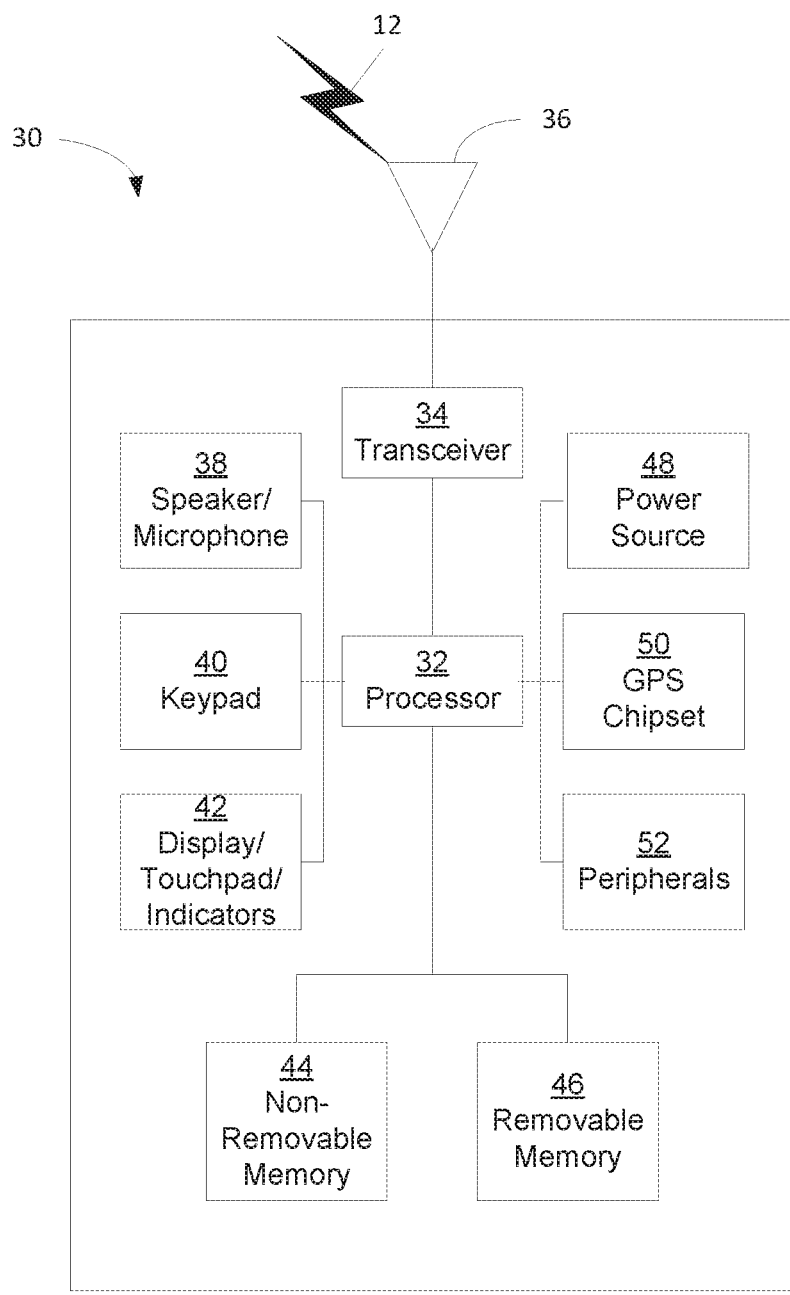
FIG. 15B is a system diagram of an example M2M/IoT terminal or gateway device that may be used within the communications system illustrated in FIG. 15A.
Figure 15C:
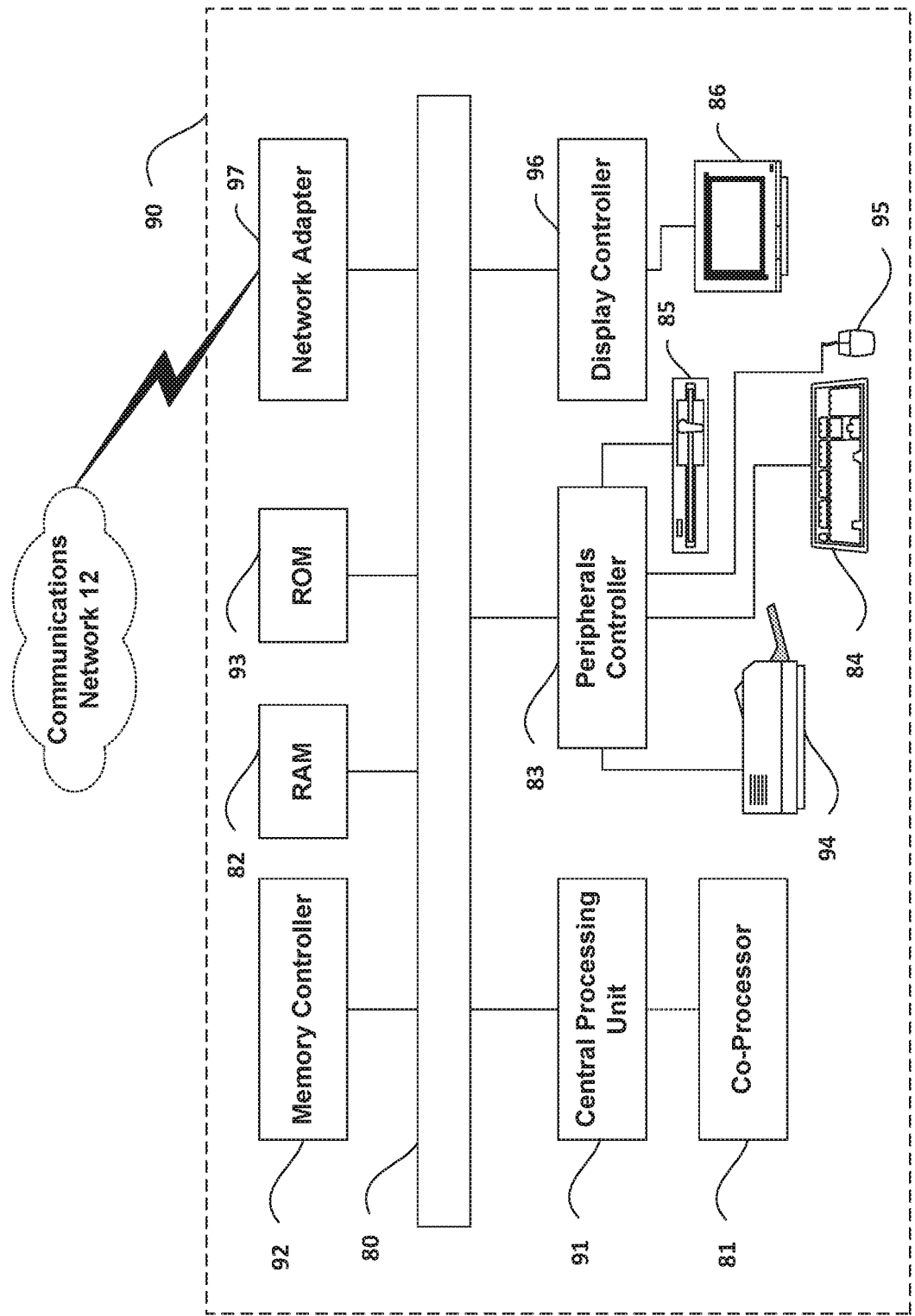
FIG. 15C is a block diagram of an example computing system in which aspects of the communication system of FIG. 15A may be embodied.

It is understood that the entities performing the steps illustrated in FIG. 7, FIG. 10, FIG. 11-FIG. 13, and other FIG.'s may be logical entities that may be implemented in the form of software (e.g., computer-executable instructions) stored in a memory of, and executing on a processor of, a device, server, or computer system such as those illustrated in FIG. 15C. That is, the method(s) illustrated in FIG. 7, FIG. 10, FIG. 11-FIG. 13, and other FIG.'s may be implemented in the form of software (e.g., computer-executable instructions) stored in a memory of a computing device, such as the device or computer system illustrated in FIG. 15C, which computer executable instructions, when executed by a processor of the computing device, perform the steps illustrated in FIG. 7, FIG. 10, FIG. 11-FIG. 13, and other FIG.'S. In an example, with further detail below with regard to the interaction of M2M devices, device 172 of FIG. 10 may reside on M2M terminal device 18 of FIG. 15A, while IoT DNS-SD server 165 of FIG. 10 may reside on M2M gateway device 14 of FIG. 15A.

Figure 7:
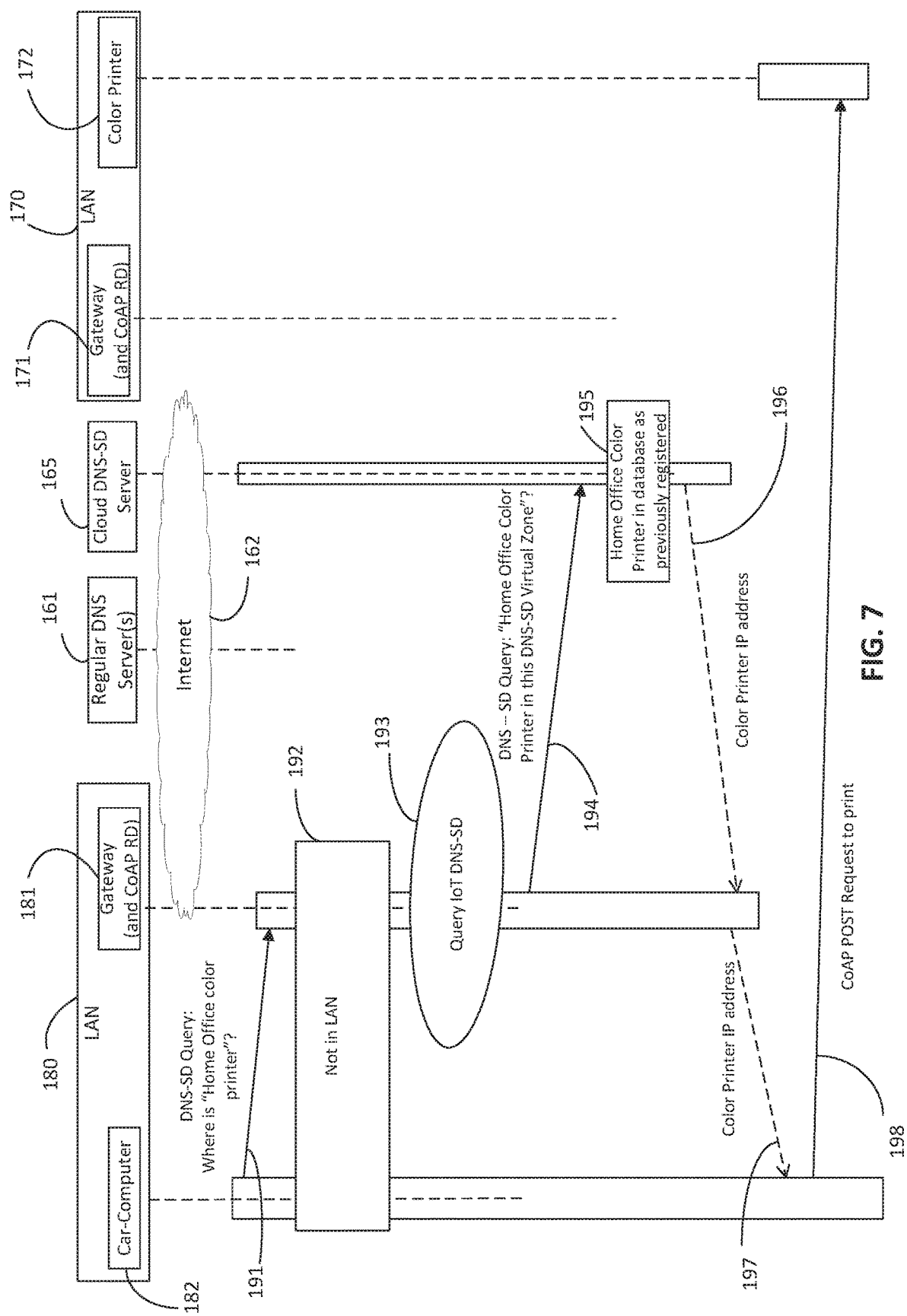
FIG. 7 illustrates an exemplary flow for a discovery of printer a virtual discovery zone.

FIG. 7 illustrates an exemplary flow for a discovery of a printer in a virtual discovery zone. At step 191, a DNS-SD query is sent to gateway 181 from IoT device 182. IoT device 182 may be a computing device located in a motor vehicle. The query of step 191 may be a request to use a home office color printer (e.g., IoT device 172). At step 192, gateway 181 searches LAN 180 and does not find the requested service. At step 193, gateway 181 determines that it should query IoT DNS-SD server 165 based on the results of step 192. Gateway 181 may include a CoAP RD. At step 194, gateway 181 sends a query to IoT DNS-SD server 165. The query may in essence reflect the query of step 191. In this query of step 194, it may request the location of IoT device 172 (e.g., a color printer at a home office). At step 195, IoT DNS-SD server 165 may determine that home office color printer (IoT device 172) is registered with IoT DNS-SD server 165. At step 196, gateway 181 receives a DNS-SD response that may include an IP address of IoT device 172 or information that indicates availability of IoT device 172. The IP address received at gateway 181 may be a public unique IP address. Gateway 181 may translate the public IP address to a private IP address via network address translation (NAT). The later request (e.g., step 198) may be to a private IP address using conventional NAT principles in order to enable IP communication between devices. Other conventional IP communication scenarios are contemplated. At step 197, gateway 181 sends IoT device 182 the IP address received at step 196. At step 198, IoT device 182 sends a request to IoT device 172 data for printing a requested document. The request of step 198 may be a CoAP POST request that includes an attachment.

The flow of FIG. 7 may be related to the following use case. The driver of a car is heading home after work in the evening. She remembers that she needs to review an important budget spreadsheet when she gets home. The driver then instructs the car computer by voice commands to print a document from her email to her "Home Office Color Printer." The car computer then sends out a standard DNS-SD discovery query for "Home Office Color Printer." This printer is not discovered in the LAN that the car is connected to. (See 191 of FIG. 7). The query is then forwarded by the car IoT gateway to the IoT cloud DNS-SD server over a cellular connection as the car knows that the cloud DNS-SD server will know of all other devices connected to its virtual discovery zone. (See Step 194 of FIG. 7). In the cloud DNS-SD server the Home Office Color Printer has been previously registered, so the cloud DNS-SD server answers the query successfully by sending the required information (including IP address) of the printer. (See Steps 196 and 197 of FIG. 7). The car computer then promptly sends a request directly to the home printer to print the spreadsheet. (See Step 198 of FIG. 7).

With continued reference to the discussion of FIG. 7, an intermediate solution of having private addresses for the IoT device 172 (e.g., printer) can be supported. In such a situation, the IP address that would be discovered for the printer would be actually assigned to the Home Gateway (gateway 171) and registered with the cloud server (IoT DNS-SD server 165). Gateway 171 (or like device) would then receive the printing request (at step 198) from the car, and it would translate it to an internal (private) IP address which is assigned locally to the printer. This utilizes a network address translation (NAT) approach. For example, gateway 171 may be aware of the mapping. Other devices may think gateway 171 provides the service.

The use case of FIG. 7 would not be efficiently accomplished using conventional DNS-SD technology, particularly for simple devices. Simple devices such as home printers are rarely entered into the public Internet DNS records because of expense, complexity for a homeowner, and security risk, among other things. Hybrid DNS-SD Proxy approach would also be difficult because if the car driver had just specified "any printer" instead of "home printer" then it would not have been obvious which DNS-SD proxy to query from the moving car. For virtual discovery zones the domain is the entire zone. Meaning that as per our explanation in FIG. 9, there is a search within the entire zone, starting from the current LAN.

Figure 8:
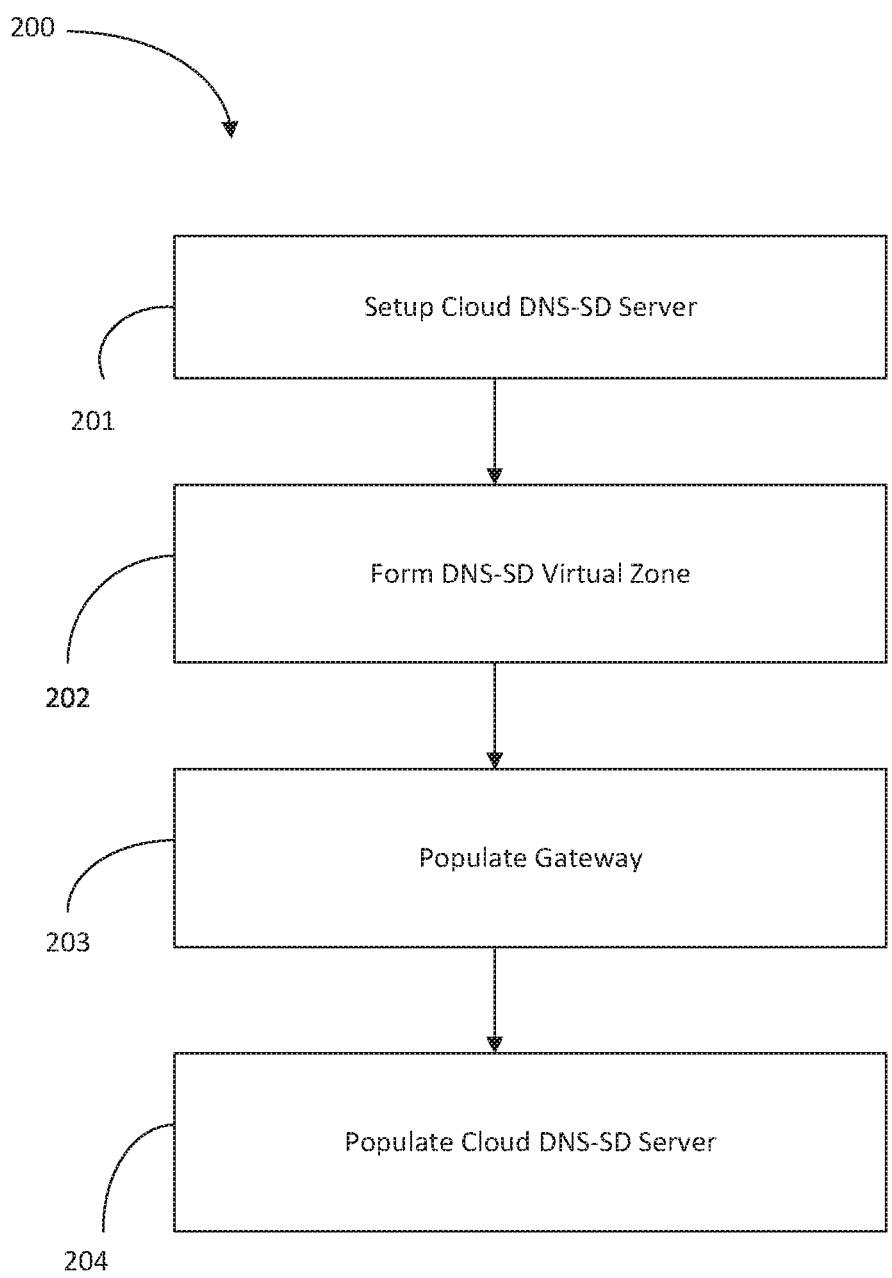
FIG. 8 illustrates an exemplary method that may be used for system startup.

FIG. 8 illustrates an exemplary method 200 that may be used for system startup. At step 201, DNS-SD server is configured as discussed above. This may be initiated by an owner or operator of a virtual discovery zone. A virtual discovery zone may be associated with the IoT local networks. For example, LAN 170 and LAN 180 of FIG. 6 combined may be a virtual discovery zone (e.g., same owner or operator). In another example, LAN 180 and LAN 170 may be form a virtual discovery zone because a group of cooperating owners (or operators) trust each other and want to share IoT services. The reason for cooperation may be because of a business relationship. The owner could, for example, be a home owner, business owner, or a public utility. The cloud DNS-SD server itself may be run on cloud server providers like Amazon™ or Google™. In an example, the cloud DNS-SD may be an offering as an IaaS for a cloud provider that targets IoT customers.

At step 202, virtual discovery zone may be defined by the operator or owner of the IoT network(s). This may be accomplished by defining an association between the cloud DNS-SD server and groups of gateways. For example, with reference to FIG. 6, virtual discovery zone 1 (not shown)={IoT DNS-SD server 165, gateway 171 and gateway 176}; and virtual discovery zone 2 (e.g., virtual discovery zone 167)={IoT DNS-SD server 165, gateway 171 and gateway 181}. Definition of the virtual zones may be configured or programmed through conventional OAM interfaces (e.g., SNMP) that exist for the IoT networks. In summary, through OAM interfaces, DNS-SD server 165 and the relevant gateways have virtual discovery zone relationships defined. Each node may be configured by its respective operator, in the context of an overall cooperating relationship between different operators. Node as discussed herein means any given box (e.g., gateway, device, DNS Server, etc.). As part of this configuration process, the gateways (e.g., gateway 171) may be provided with the cloud DNS-SD server (e.g., DNS-SD server 165) hostname and any security credentials needed to access or write to the cloud DNS-SD server. Note that since DNS-SD server 165 is in the cloud it does not have to be resident in a single physical node. The standard cloud functionality may distribute it as required such as for load balancing purposes. This may be done transparently to the gateways (e.g., gateway 171) and IoT devices (e.g., IoT device 172).

At step 203, the CoAP RD (which may be a portion of the gateway) in each LAN segment is populated. The devices in the LAN registers their URIs with the RD. See Link Format messages as discussed in RFC 6690, which is incorporated by reference in its entirety. The URIs and associated information can then be mapped into their associated DNS-SD RR format by the RD as discussed in Section 9 of CoRE Resource Directory. Note that the RD can store information about CoAP and HTTP based services.

At step 204, each gateway (e.g., gateway 171) will decide which DNS-SD records it wants to export to the cloud DNS-SD server (e.g., IoT DNS-SD server 165). The previous sentence may occur once the CoAP RD records are stable (e.g., no new RD updates for a threshold period). If RD of gateway 171 is a small (e.g., contains a relatively small amount of records), the RD of gateway 171 may decide to export, for simplicity, all its records to IoT DNS-SD server 165. If RD of gateway 171 contains a relatively large amount of information, then it may be inefficient to export all the records. In this case, if gateway 171 has some key services that it is aware of (e.g., by application knowledge) will be of interest to devices outside LAN 170, then gateway 171 will export these specific records only to IoT DNS-SD server 165. The conventional process for exporting records from a RD to a DNS-SD server can be used as described in Section 9.6 of CoRE Resource Directory. The IoT DNS-SD server 165 will thus be populated with conventional DNS RRs as well as the new RR discussed herein. Also if a relevant update is made to the records of the RD after the above process, then the RD may export to the DNS-SD only the new RRs.

Figure 9:
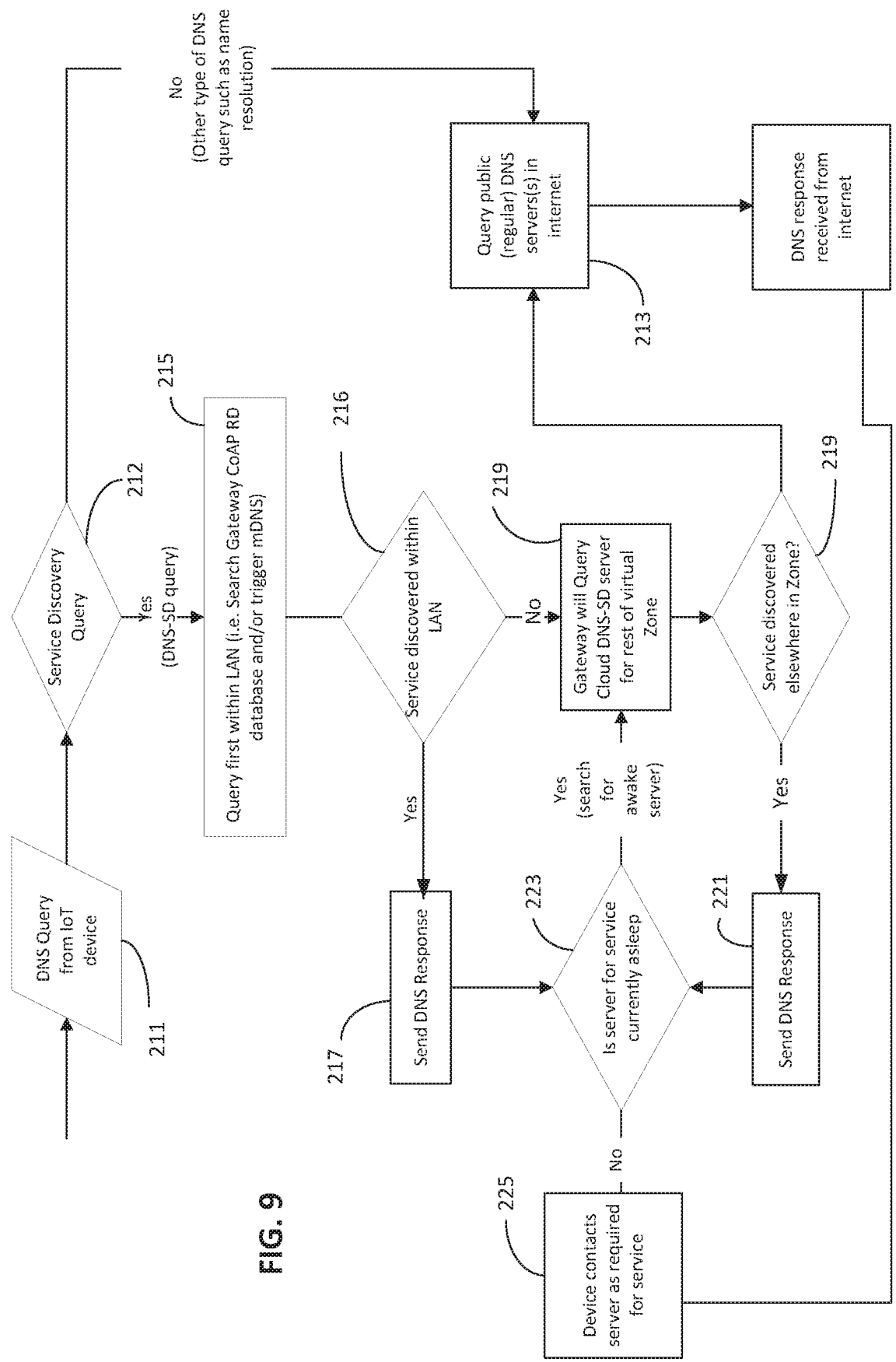
FIG. 9 illustrates an exemplary method for system operation.

FIG. 9 illustrates an exemplary system operation phase. The steps associated with FIG. 8 may be conserved to be in a system operation phase. The steps below are considered in the context of FIG. 6 for illustrative purposes. At step 211, there is a DNS query by IoT device 172 of LAN 170. At step 212, gateway 171 may determine if the query of step 211 is a service discovery DNS query. At step 213, a query is made to DNS server 161 on the Internet, if the query of step 211 is determined to be a conventional DNS query (e.g., name resolution query).

At step 215, if the query of step 211 is a service discovery DNS query, a local query within the LAN 170 may occur. For example, this local query may be a search of the CoAP RD or initiating an mDNS multicast query to all other devices in LAN 170, among other things. In an first example, IoT device 172 may decide to directly initiate an mDNS multicast query to all other devices in LAN 170. In this case gateway 171 does not have to do anything other than act as a normal IoT device and possibly respond to the mDNS query if it supports the given service. In a second example, IoT device 172 may decide to do a unicast DNS-SD query. When gateway 171 receives the unicast DNS-SD request it will intercept it and will first try to see if the service can be found in its local CoAP RD database. As noted previously, it is a simple mapping between RD and DNS-SD records as described in Section 9 of CoRe Resource Directory. The choice of which local query (e.g., mDNS or unicast DNS-SD to RD) is left up to application logic of IoT device 172.

At step 216, a determination is made if the service is discovered within LAN 170. At step 217, if the service requested in the query of step 211 is found in LAN 170, then gateway 171 or another local device responds to the requesting IoT device 172 with a DNS-SD response. At step 219, if the service requested in the query of step 211 is not found in LAN 170, then gateway 171 may not respond immediately to the requesting IoT device 172. Instead gateway 171 may forward a unicast DNS-SD query to IoT DNS-SD server 165 to see if the requested service can be found elsewhere within the virtual discovery zone (e.g., within LAN 180 within virtual discovery zone 167). Note it is possible that gateway 171 may belong to several overlapping discovery virtual zones. Therefore, when IoT DNS-SD server 165 receives the query of step 217, IoT DNS-SD server 165 will make a decision about which virtual discovery zone it wants this particular query to search. This decision may be based on load balancing, security credentials, or other factors. There may be a default configuration of IoT DNS-SD server 165 for allowing the overlapping discovery virtual zones to be searched.

At step 221, if the service was discovered elsewhere in virtual discovery zone 167, then gateway 171 receives the DNS-SD response from the IoT DNS-SD server 165 and forwards the response to the requesting IoT device 172.

At step 223, IoT device 172 looks at the responses and checks if the server that can do the requested service is currently asleep or awake (or will wake up in a relatively short time) by looking at the returned new RR record with the sleep status as discussed herein. If the server is asleep then IoT device 172 via gateway 171 will attempt to find another server somewhere in the same virtual discovery zone.

At step 219, if there are no available awake service servers anywhere in the zone then IoT device 172 can trigger gateway 171 to send a DNS-SD request to regular Internet DNS server 161. o Note that IoT device 172 may decide how many times it wants to trigger the various DNS-SD request based on its application timing or other requirements. At step 225, IoT device 172 contacts the service server as required.

Below is a discussion signaling changes that are associated with sleep modes for devices. As discussed herein, a protocol element of DNS is the concept of RRs. These RRs describe characteristics of a DNS domain as well as individual devices. For example, the "A" record provides the IPv4 address of a device (host), and the "MX" record provides the e-mail server name for a given domain.

Signaling changes are provided below that may apply to IETF standards. The generic DNS RR format is as follows in Table 4. See support from RFC 1035 and http://www.iana.org/assignments/dns-parameters/dns-parameters.xhtml (hereinafter DNS Parameters), which both are incorporated by reference in their entirety.

TABLE 4

Generic format of DNS RR

| name | class | rr type | type specific data |
|---|---|---|---|
| Name of device (host) which this RR applies to | The class of the DNS record Usually set to IN = Internet | Resource Record type (i.e. name) E.G. "A" or "MX" | The specific information carried in this RR E.G. for "A" RR this would be the IPv4 address |

Now we define a new DNS RR (called "IOTSLEEPINFO") as follows in Table 5 and below to store IoT device sleep characteristics.

TABLE 5

Definition of new DNS RR called IOTSLEEPINFO

| name | class | rr type | type specific data-1 | type specific data-2 | Type specific data-3 |
|---|---|---|---|---|---|
| E.G. Light.Door.BestCompany.com | IN | IOTSLEEPINFO | Current Sleep State | Sleep Duration | Sleep Periodicity |

Where:
1. RR type=IOTSLEEPINFO (which is a new RR type)
2. Current Sleep State=0 (Awake), or 1 (Asleep)
3. Sleep Duration=32 bit unsigned integer (or integer of another length) which indicates the time interval (in seconds, for example) that the IoT device can be asleep. Zero value means that the sleep duration is unknown.
4. Sleep Periodicity=16 bit unsigned integer which indicates the time interval (in seconds, for example) between the start of Sleep durations. Zero value may mean that the sleep periodicity is unknown.
5. Class=Internet The new RR (IOTSLEEPINFO) defined above may be stored in either the normal Internet DNS infrastructure or in the new cloud DNS-SD server introduced herein. So, the new RR (IOTSLEEPINFO) may have significant value for both the classical DNS infrastructure as well as the new cloud DNS-SD server. Below (e.g., FIG. 13) there is additional discussion with regard to handling a sleepy node.

Figure 10:
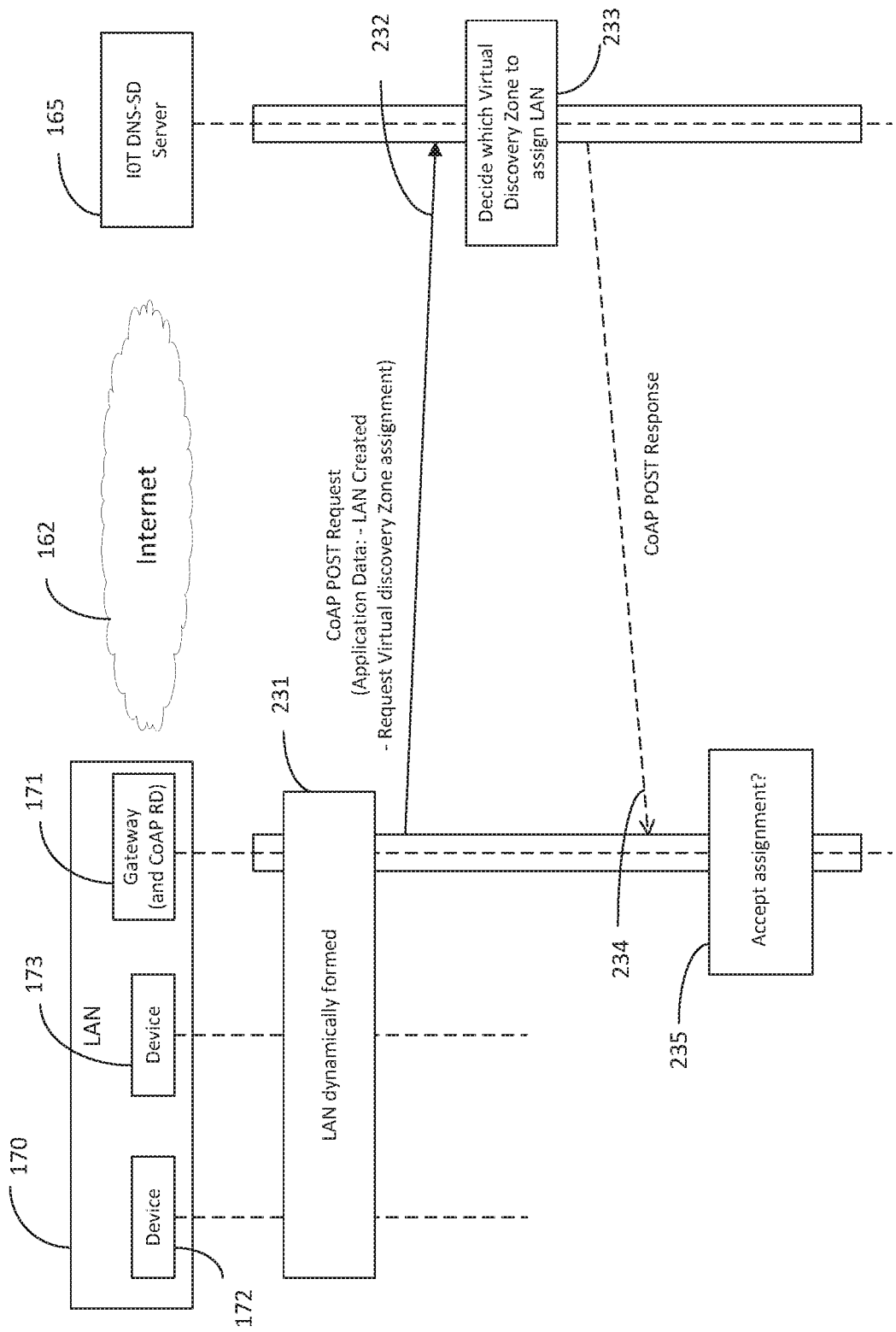
FIG. 10 illustrates an exemplary phase of self-configuring a virtual discovery zone.

Below are alternatives for virtual discovery zone configuration. Herein, an OAM based approach is provided on how to create and configure virtual discovery zones. An alternative approach may be for a dynamic network self-configuring (automatic) approach, as discussed below, based on signaling between the controlling nodes (e.g., IoT DSN-SD server, IoT gateways). Note other approaches as discussed herein may be done automatically. FIG. 10 illustrates an exemplary phase of self-configuring virtual discovery zones with reference to the system of FIG. 6. At step 231, LAN 170 may be dynamically (automatically) formed. For example, an 802.15 temperature sensor network deployed during a fire by fire department. At step 232, a message, such as a CoAP POST request, may be sent. For example, when a new IoT LAN 170 is created, its gateway 171 may automatically send a CoAP based application message to IoT DNS-SD server 165 informing it that LAN 170 has just been created. The message of step 232 may include a request that LAN 170 be assigned virtual discovery zone 167 and may include requirements for forming virtual discovery zone 167. The message of step 232 may also contain information about LAN 170 such as its physical GPS coordinates (e.g., gateway 171 coordinates) and the key services supported by IoT device 172 and IoT device 173 within LAN 170. The message of step 232 may also indicate the physical coverage by LAN 170. The physical coverage may be associated with a geographic area (e.g., a building, gps coordinates, city, state, or the like). CoAP RD (co-located with the gateway 171) may send another CoAP based application message (at a later time) to populate information about devices (e.g. their IP addresses) and their resources or services within LAN 170. The use of CoAP herein is exemplary. An alternative would be to use HTTP messages to perform the same function.

At step 233, IoT DNS-SD server 165 determines which virtual discovery zone to associate with LAN 170. A virtual discovery zone is a logical grouping of LANs for which there will be a common DNS-SD service discovery zone. The decision of which zone to assign the new LAN could for example be made on the GPS coordinates of the LAN. In other words, a cloud DNS-SD server (IoT DNS-SD server 165) may create a virtual discovery zone to cover a certain geographical area. Also other factors could be considered such as access permission, service subscribed, etc. If multiple virtual discovery zones are assigned, the message of step 234 may include multiple identifiers and the list of devices or services belonging to each virtual discovery zone of the multiple virtual discovery zones. The identifier of virtual discovery zone 167 may be determined by IoT DNS-SD server 165 (although gateway 171 could suggest an identifier during the process of reporting newly created LAN 170 to IoT DNS-SD server 165), which could be a hash of GPS or other coordinates of new LAN 170 plus its services, for instance. The geography may be associated with a single device of LAN 170, average or other threshold geography of devices of LAN 170 (e.g., on average devices on LAN are in geographic boundary), geography primarily of gateway 171, or the like. The following are a few examples for assigning a virtual discovery zone for a newly created LAN. If a first example, each virtual discovery zone may be associated with a certain physical area. A newly created LAN will then be assigned with an existing virtual discovery zone if the LAN lies within its coverage. In a second example, an IoT DNS-SD server may assign two or more virtual discovery zones to the newly created LAN. A reason for assignment of multiple LANs may be associated with the coverage of the LAN for being too large or if there is some privacy, security, or other concern.

At step 234, a message such as a CoAP based application message is sent. The message may include information associated with the virtual discovery zone it is assigned (e.g., assigned to virtual discovery zone 167). The message of step 234 may include the identifier of assigned virtual discovery zone 167. At step 235, LAN 170 may accept or reject the assignment of virtual discovery zone 167.

Figure 11:
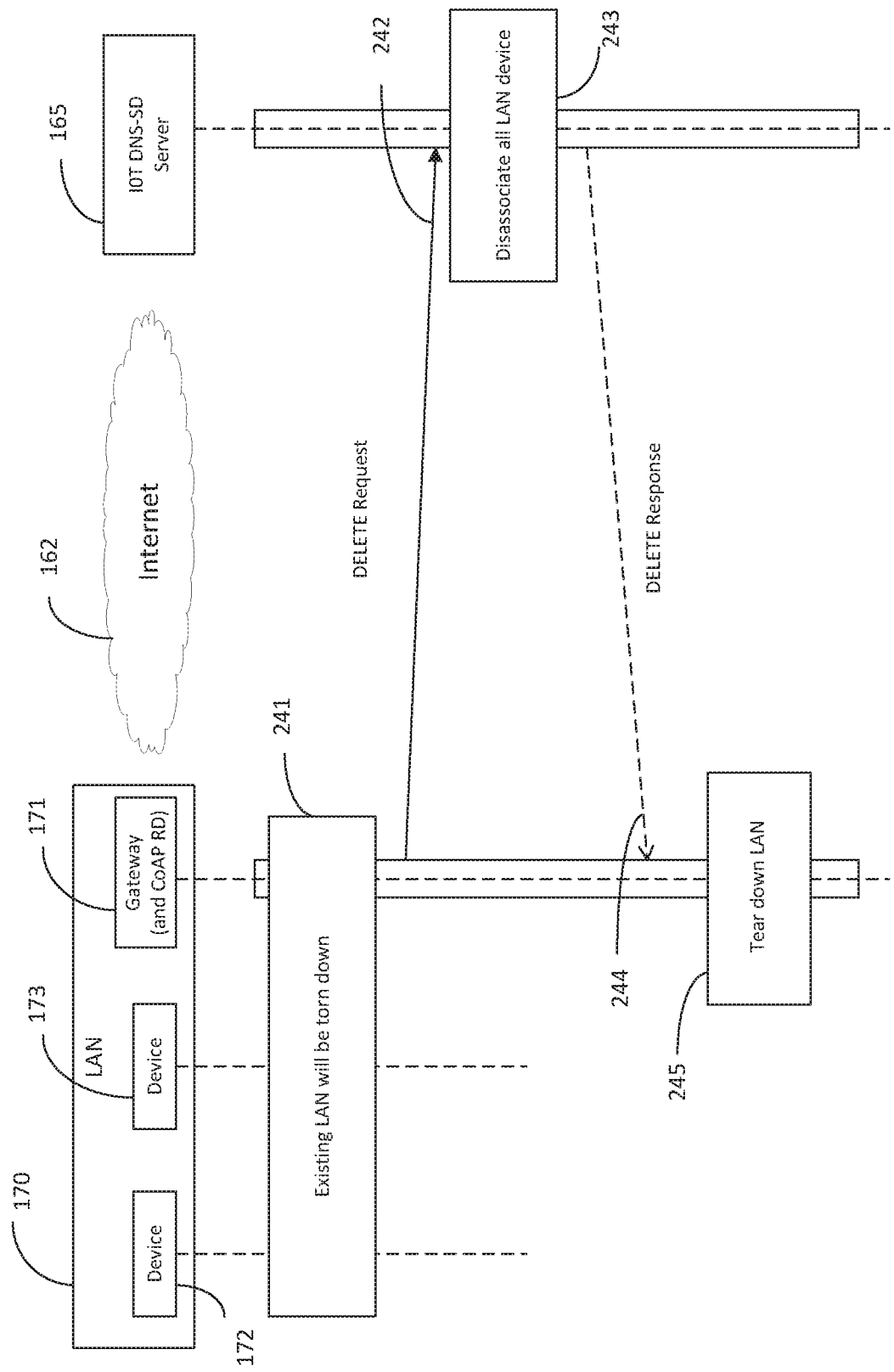
FIG. 11 illustrates another exemplary phase of self-configuring a virtual discovery zone.

FIG. 11 illustrates another exemplary phase of self-configuring a virtual discovery zone. At step 241, there may be a determination to tear down LAN 170 (e.g., a few days after the fire is extinguished in a previous example) or otherwise disassociate LAN 170 to virtual discovery zone 167. In an example, 802.15 temperature sensor network deployed during a fire by Fire Department is no longer needed and will be decommissioned. At step 242, gateway 171 sends a message, such as a CoAP based application message, to IoT DNS-SD server 165. The message of step 242 includes a request for LAN 170 to be disassociated from virtual discovery zone 167. In an example: (Application Data:—Request disassociation of LAN 170 from virtual discovery zone 167). At step 243, IoT DNS-SD server 165, receives the message of step 242 and appropriately disassociates LAN 170 from virtual discovery zone 167 if the message has the correct permissions. At step 244, a message is sent that includes a confirmation of deletion or other considerations. The message of step 244 may be a CoAP DELETE response. At step 245, gateway 171 may continue any steps needed to tear down LAN 170 or disassociate from IoT DNS-SD server 165.

With continued reference to FIG. 11, there are several cases that may cause adjustments to existing virtual discovery zones. The following are a few examples. In a first example, when IoT device 172 or its supported devices become unavailable, the corresponding gateway 171 (or CoAP RD) may send a message, such as a CoAP based application message, to update IoT DNS-SD server 165. As a result, IoT device 172 or its services will be removed from the records maintained by IoT DNS-SD server 165. In a second example, when IoT device 172 changes its sleeping schedule, gateway 171 (or CoAP RD) will send a CoAP based application message to report the new sleep information to the cloud DNS-SD server. As a result, the cloud DNS-SD will update its DNS-SD records. In a third example, when gateway 171 or IoT device 172 which is considered within LAN 170 changes its coordinates or physical location, gateway 171 (or CoAP RD) will send a CoAP based application message to send the new coordinates to IoT DNS-SD server 165. As a result, IoT DNS-SD server 165 may 1) maintain the current virtual discovery zone 167 to gateway 171 (e.g., if the physical coordinates do not change much), 2) assign a new virtual discovery zone to gateway 171 (e.g., if the change to the physical coordinates exceeds a threshold), 3) merge to another existing virtual discovery zone (e.g., if the new physical coordinates overlap with another existing virtual discovery zone), or 4) split with another existing virtual discovery zone (e.g., if the new physical coordinates overlap with an existing virtual discovery zone and there are too many devices there already). Gateway 171 or other devices in LAN 170 may reject the assignment of a virtual discovery zone.

Figure 12:
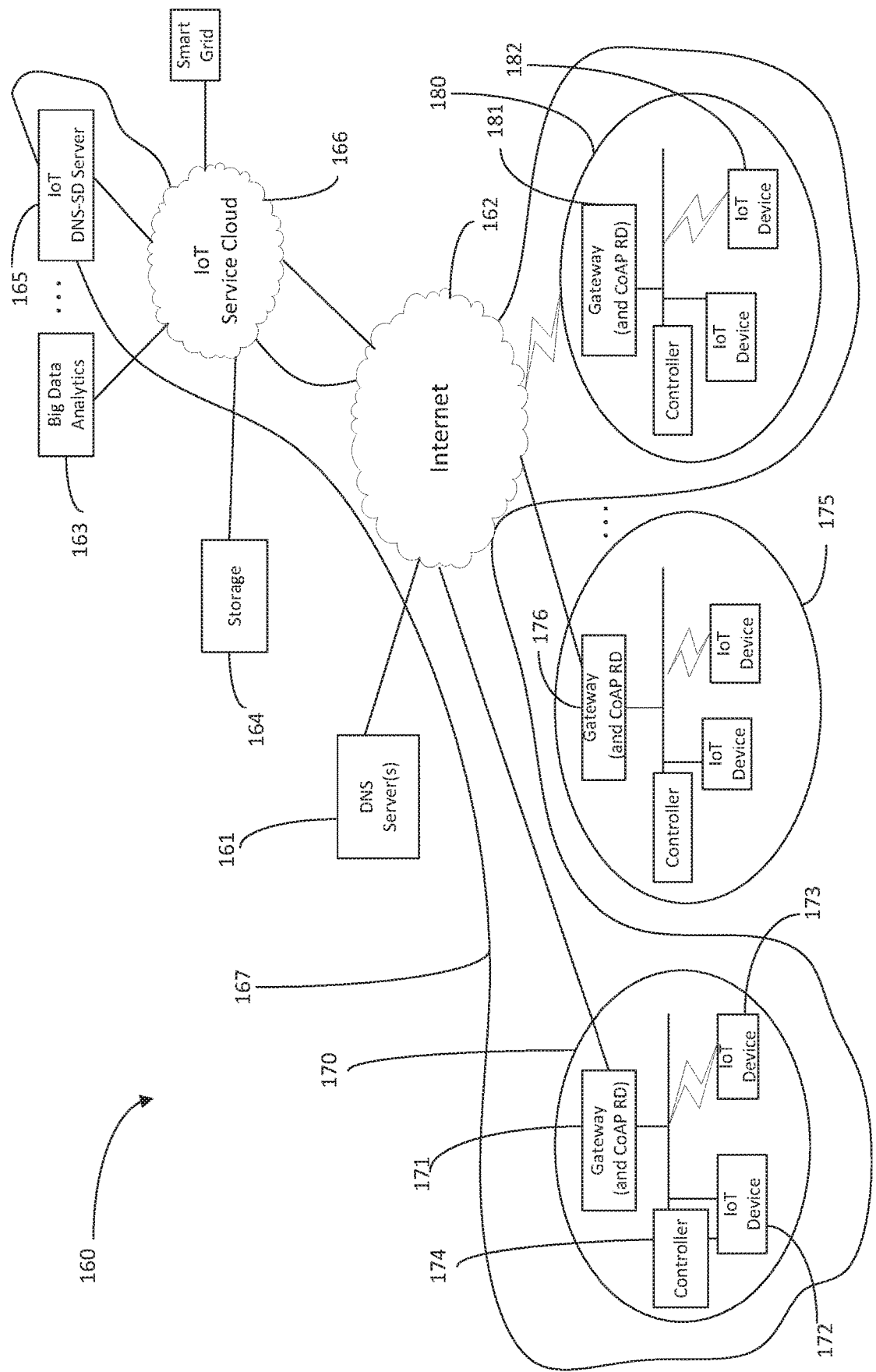
FIG. 12 illustrates an exemplary wide area service discovery implementation that may incorporate sleep node handling.

FIG. 12 illustrates an exemplary wide area service discovery implementation that may incorporate sleep node handling. An exemplary scenario may encompass sleep node handling for a smart grid operator with a city wide deployment spanning multiple LANs. Alternatively, it could be a group of cooperating smart grid operators (each owning a limited number of LANs) that are cooperating together for a city wide deployment. The context of FIG. 12, as discussed in more detail below, focuses primarily on IETF related signaling, and associated processing logic within the nodes used to support wide area service discovery.

For illustration purposes, consider FIG. 12 in the following scenario. A home meter (e.g., IoT device 172) in LAN 170 (e.g., local network covering a given neighborhood) needs to find an electricity rate (cost) server that is not sleeping (e.g., is awake) to poll it for the current electricity rate (cost) information. The home meter needs to do this periodically so that it can display the latest rate information to the home owner. Certain devices called controllers (e.g., controller 174 or controller 183) are capable of providing the rate information.

Figure 13:
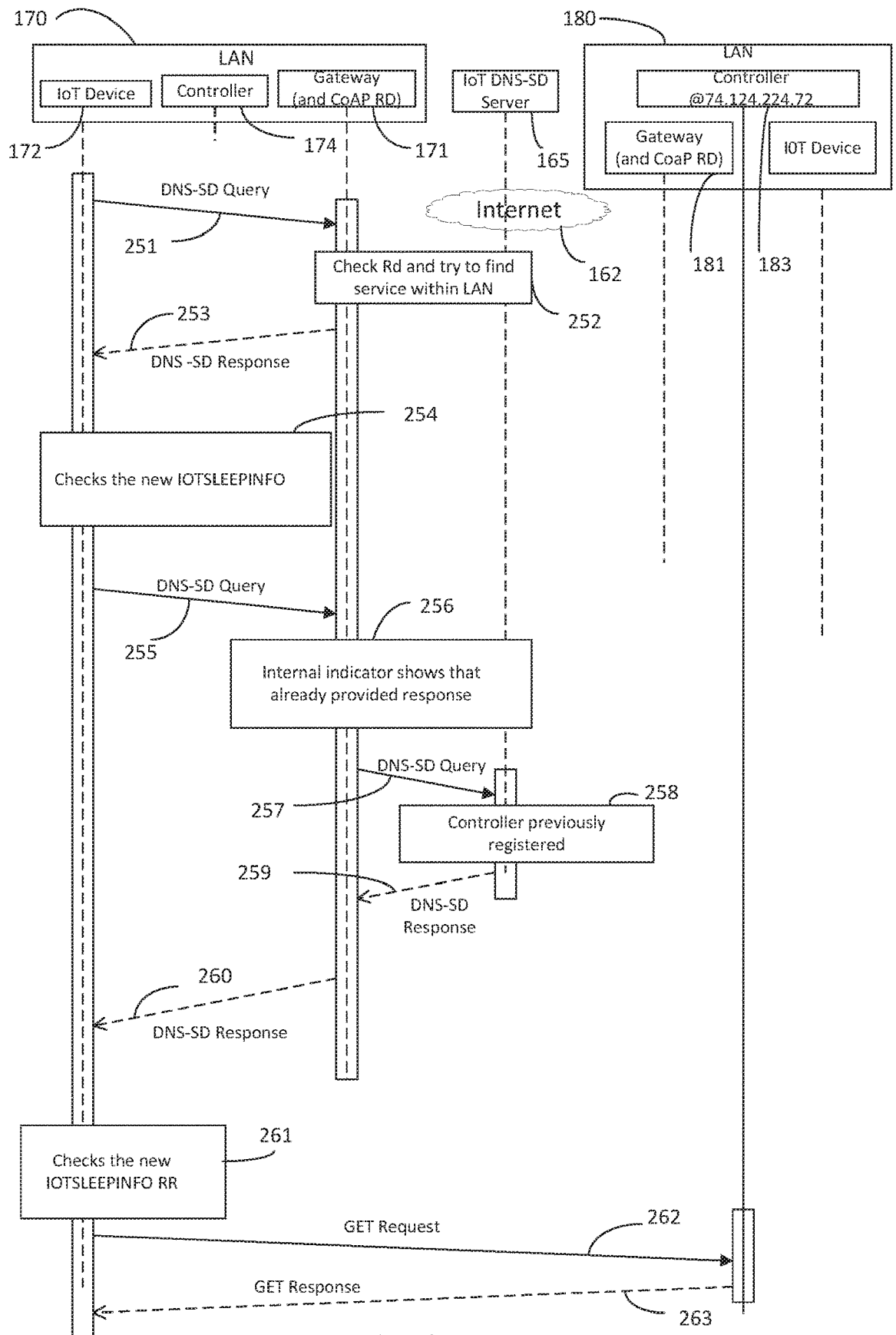
FIG. 13 illustrates an exemplary flow for handling the sleepy node scenario using DNS RR.

With reference to the aforementioned meter-controller scenario, FIG. 13 illustrates an exemplary flow for handling the sleepy node scenario using DNS RR called "IOTSLEEP-INFO" that is discussed above. At step 251, a request is sent asking for the "rate info server." At step 252, gateway 171 checks RD and tries to find service within LAN 170. At step 253, gateway 171 sends a response that provides that rate info is at controller 174. The response may also include DNS RR that provides sleep information about controller 174 (e.g., IOTSLEEPINFO—Table 5). At step 254, IoT device 172 (e.g., home meter) checks the new IOTSLEEPINFO RR and determines that controller 174 is currently asleep. At step 255, a message is sent which includes a request seeking the "rate info server." The request at step 255 may be similar to the request of step 251. At step 256, gateway 171 may determine that response was provided from RD at step 253, so next step is to query IoT DNS-SD server 165.

With continued reference to FIG. 13, at step 257, a message is sent that includes a request for the "rate info server" located in virtual discovery zone 167. At step 258, IoT DNS-SD server 165 determines that controller 183 was previously registered as a "rate info server." At step 259, a message is sent that includes the contact information (e.g., IP address) for another "rate info server" (e.g., controller 183 @ 74.125.224.72). At step 260, the information of step 259 is forwarded to IoT device 172. At step 261, IoT device 172 determines that controller 183 is awake. This awake state may have been determined by examining a DNS RR that accompanied the message of step 260. At step 262, a message is sent requesting the current electricity rate. The message may be a CoAP GET Request. At step 263, IoT device 172 may receive a message indicative of being from 262. The message of step 263 may include CoAP GET response with the current electricity rate data.

With continued reference to FIG. 12 and FIG. 13, below are further considerations for the aforementioned meter sleep scenario. The request of step 251, which may be a DNS-SD query, from home meter (IoT device 172) to gateway 171 results in it being told that controller 174 in the same LAN 170 supports the required service of providing rate info. However, the "IOTSLEEPINFO" RR, which may be included in the message of step 253, indicates that controller 174 is currently asleep and will be asleep for a time longer than an acceptable threshold. At step 255, another request (DNS-SD query) may be made to gateway 171. At step 256, previous requests are considered. Gateway 171 needs to keep track of previous queries (for some cache period) and knows that it recently provided an answer to a similar question. So it assumes that the previous answer was not satisfactory so it now queries IoT DNS-SD server 165 to find another rate info server somewhere else in virtual discovery zone 167. Alternatively steps 252 through 255 may be skipped and gateway 171 may directly examine the appropriate DNS RR (IOTSLEEPINFO) and other preferences to determine whether to query another controller for the requested rate info.

When IoT DNS-SD server 165 receives the query of step 257, at step 258, it will have to make a decision about which virtual discovery zone it wants to search for this particular query. This can, for example, be accomplished by looking the originating IP address of gateway 171 (which may be contained in the message carrying the query of step 257). In an example, from the IP address of gateway 171, IoT DNS-SD server 165 may determine by its internal data structures mapping RRs to virtual discovery zones. As stated herein the virtual discovery zones are defined as relationships between groups of gateways (and their corresponding devices) and the cloud DNS-SD server (e.g., IoT DNS-SD server 165). As illustrated in FIG. 13, IoT DNS-SD server answers back at step 259 with another rate info server (e.g., controller 183) in a different LAN (LAN 180). The meter may see that this controller 180 is currently not asleep for its IOTSLEEPINFO RR and so is able to directly query it and get the rate info that it was looking for. Alternatively, as discussed above the meter (IoT device 172) may not receive the IOTSLEEPINFO RR and may just send its request to the address provided by IoT DNS-SD server 165.

Figure 14:
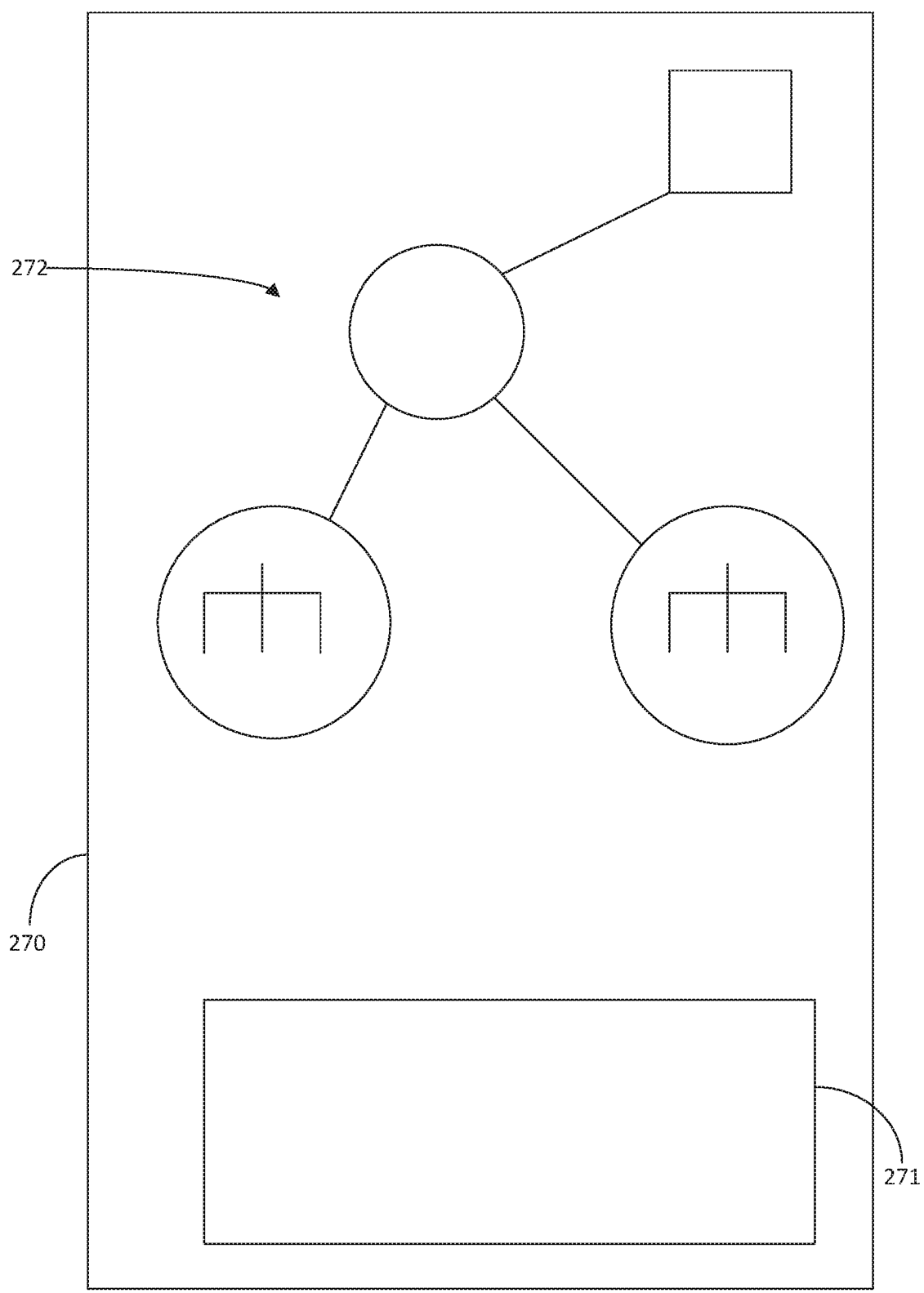
FIG. 14 illustrates an exemplary user interface associated with wide area service discovery.

FIG. 14 illustrates an exemplary graphical user interface associated with wide area service discovery discussed herein. Display 270 (also display 42) may allow a user to interface part of an OAM system of IoT DNS-SD server 165. Display 270 may be a touch screen and allow the provider of IoT DNS-SD server 165 to graphically display its associated virtual discovery zones. At 272 of display 270 provides a graphical view of the LANs contained in a given virtual discovery zone as shown in, for example, in FIG. 12, FIG. 6, and others. At 271 of display 270, there may be a text representation of commands, variables, input, output, flows, success and failure of operations associated with wide area service discovery as discussed herein. The following is an example: Virtual Discovery Zone 167={IoT DNS-SD server 165, LAN 170, LAN 180}. Virtual discovery zones may have been created by OAM or dynamically in another manner.

Also, the provider of IoT DNS-SD server 165 could also allow remote views of virtual discovery zones by the various owners of LANs. These views may be through a Web interface that an owner of a LAN could access from a laptop or smartphone with a password or other security credential. In an example, assume in a context similar to FIG. 12, individual LANs were owned by different smart grid operators (who were cooperating together for a city wide deployment). An operator-A owns a LAN-1, LAN-2 and LAN-3 (not shown) and operator-B owns LAN-4 and LAN-5. Then either operator-A or operator-B could get a graphical view of the virtual discovery zone (similar to FIG. 12) or a text representation.

FIG. 15A is a diagram of an example machine-to machine (M2M), Internet of Things (IoT), or Web of Things (WoT) communication system 10 in which one or more disclosed concepts associated with wide area service discovery may be implemented (e.g., FIG. 6-FIG. 14, among others). Generally, M2M technologies provide building blocks for the IoT/WoT, and any M2M device, or M2M gateway may be a component of the IoT/WoT.

As shown in FIG. 15A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 15A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M platform 22 (e.g., service layer), as described below. M2M devices 18 and gateways 14 may communicate via various networks including, cellular, WLAN, WPAN (e.g., Zigbee, 6LoWPAN, Bluetooth), direct radio link, and wireline for example.

FIG. 15B is a system diagram of an example M2M device 30, such as an M2M terminal device 18 or an M2M gateway device 14 that may be used with wide area service discovery. As shown in FIG. 15B, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., IoT device 172, Controller 174, gateway 171, IoT DNS-SD server 165, and others) may be an exemplary implementation that performs the disclosed systems and methods for wide area service discovery.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 15B depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 15B as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the LMS in some of the examples described herein are successful or unsuccessful (e.g., IOTSLEEPINFO RR or reaching a device outside a LAN, but within a virtual discovery zone), or otherwise indicate a status of virtual discovery zone or associated methods and components. The control lighting patterns, images, or colors on the display or indicators 42 may be reflective of the status of any of the method flows or components in the FIG.'s illustrated or discussed herein (e.g., FIG. 6-FIG. 14, etc.). Disclosed herein are messages and procedures of wide area service discovery. The messages and procedures may be extended to provide interface/API for users to request wide area service discovery related information via an input source (e.g., speaker/microphone 38, keypad 40, or display/touchpad 42) and request, configure, or query wide area service discovery information, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 15C is a block diagram of an exemplary computing system 90 on which, for example, platform of FIG. 15A may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for wide area service discovery, such as receiving DNS-SD queries.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 15A.

Figure 15D:
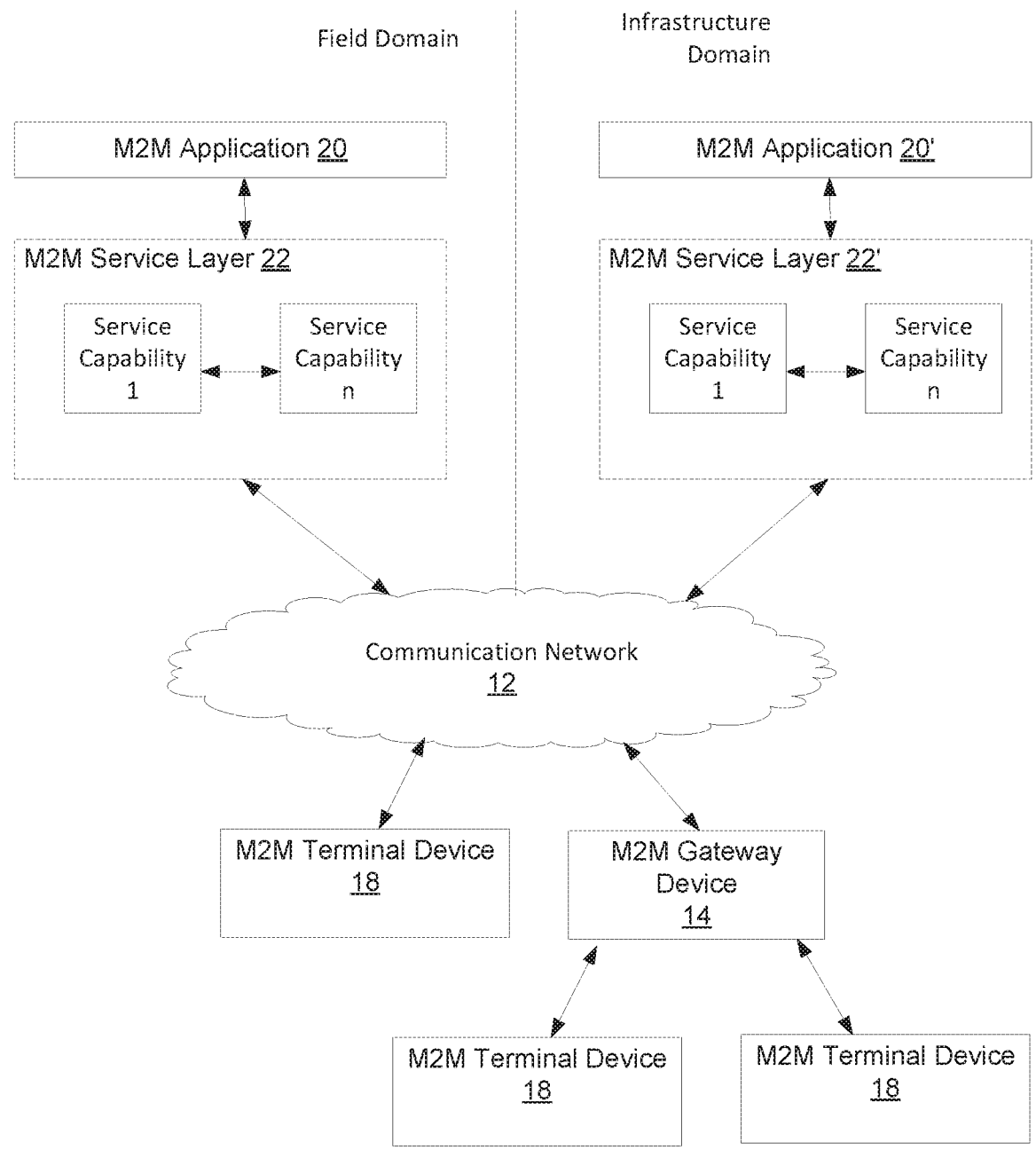
FIG. 15D illustrates an exemplary architecture that may be used within the M2M/IoT communications system illustrated in FIG. 15A.

Referring to FIG. 15D, the illustrated M2M service layer 22 in the field domain provides services for the M2M application 20 (e.g., an application of IoT device 172), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 15D, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using with wide area service discovery, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The wide area service discovery of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the wide area service discovery of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the wide area service discovery of the present application can be implemented as part of an M2M network that uses a Service Oriented Architecture (SOA) or a resource-oriented architecture (ROA) to access services such as the wide area service discovery of the present application.

As discussed herein, the term "service layer" may be considered a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications or various devices with access to a collection of or a set of the above mentioned capabilities or functionalities, supported by the service layer, which can be referred to as a CSE or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (e.g., functional interfaces between such functional entities) in order for them to use such capabilities or functionalities.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—wide area service discovery—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Note that this disclosure focuses on using the proposed solution for IoT use cases. However, it is clear that the invention may also apply to non-IoT scenarios with similar properties.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for wide area service discovery for devices. A method, system, computer readable storage medium, or apparatus has means for receiving a first message on a first local area network, the first message comprising a request for a service; determining that the service is not located on the first local area network; responsive to determining that the service is not located on the first local area network, providing a second message to a server, the second message comprising a request for the service; and receiving a third message, the third message comprising information associated with the service. The first message may be one of a plurality messages comprising a request for the service, the plurality of messages may be sent by multicast DNS. The server may operate as a server for DNS-SD. The information associated with the service may include an address of the service. The information associated with the service may include an indication of the availability of the service. The service may be located on a remote device and the remote device may be located on a second local area network. The server may be located on a wide area network. The method, system, computer readable storage medium, or apparatus has means for providing the information associated with the service to a client device, the client device indicative of being a requester of the service via the first message. The first message may be a DNS-SD query. The third message may be a DNS-SD response to the second message. The method, system, computer readable storage medium, or apparatus has means for determining that the service is not located on the first local area network based on query of a constrained application protocol, CoAP, resource directory. The second message may include a request for an assignment of a virtual discovery zone. The third message may include an assignment of the virtual discovery zone. All combinations in this paragraph (including the removal or addition of steps) are contemplated in a manner that is consistent with the other portions of the detailed description.

A method, system, computer readable storage medium, or apparatus has means for receiving from a first LAN a DNS-SD query for a service; and responsive to receiving the DNS-SD query, providing information about the service, the service on a second LAN.

A method, system, computer readable storage medium, or apparatus has means for providing a request to a service; and receiving a response to the request, the response comprising sleep node information about a device associated with the service The subject matter described herein is provided by way of illustration. Various modifications and changes may be made to the subject matter described herein without following the examples and applications illustrated and described (e.g., skipping or adding steps), and without departing from the true spirit and scope the disclosed subject matter, which is set forth in the claims.

What is claimed:

1. An apparatus comprising:
a processor; and
a memory coupled with the processor, the memory comprising executable instructions that when executed by the processor cause the processor to effectuate operations comprising:
receiving a first message from a first device on a first local area network, the first message comprising a domain name system-service discovery (DNS-SD) query for a service;
determining that the service is not located on the first local area network;
responsive to determining that the service is not located on the first local area network, providing a second message to a server, the second message comprising a DNS-SD query for the service;
receiving, from the DNS-SD server, a third message, the third message comprising a DNS-SD response to the second message; and
forwarding the third message to the first device, the third message being generated by the server and comprising information associated with the requested service indicating that the requested service is discovered elsewhere in a virtual discovery zone,
wherein the third message comprises a DNS resource record that provides sleep characteristics of a device that hosts the requested service, the sleep characteristics comprising a current sleep state, sleep duration, and sleep periodicity, and
wherein the virtual discovery zone is a logical grouping of local area networks with a common DNS-SD service discovery zone that enables service discoveries over services in the logical grouping of local area networks.

2. The apparatus of claim 1, wherein the first message is one of a plurality messages comprising a request for the service, the plurality of messages sent by multicast domain name system.

3. The apparatus of claim 1, wherein the information associated with the service comprises an address of the service.

4. The apparatus of claim 1, wherein the information associated with the service comprises an indication of the availability of the service.

5. The apparatus of claim 1, wherein the server is located on a wide area network.

6. The apparatus of claim 1, wherein the service is an infrastructure as a service, IAAS.

7. The apparatus of claim 1, further operations comprising providing the information associated with the service to a client device, the client device indicative of being a requester of the service via the first message.

8. The apparatus of claim 1, wherein the determining that the service is not located on the first local area network is based on query of a constrained application protocol, CoAP, resource directory.

9. A non-transitory computer readable storage medium comprising computer executable instructions that when executed by a computing device cause said computing device to effectuate operations comprising:
receiving a first message from a first device on a first local area network, the first message comprising a domain name system-service discovery (DNS-SD) query for a service;
determining that the service is not located on the first local area network;
responsive to determining that the service is not located on the first local area network, providing a second message to a server, the second message comprising a DNS-SD query for the service;
receiving, from the DNS-SD server, a third message, the third message comprising a DNS-SD response to the second message; and
forwarding the third message to the first device, the third message being generated by the server and comprising information associated with the requested service indicating that the requested service is discovered elsewhere in a virtual discovery zone,
wherein the third message comprises a DNS resource record that provides sleep characteristics of a device that hosts the requested service, the sleep characteristics comprising a current sleep state, sleep duration, and sleep periodicity, and
wherein the virtual discovery zone is a logical grouping of local area networks with a common DNS-SD service discovery zone that enables service discoveries over services in the logical grouping of local area networks.

10. The computer readable storage medium of claim 9, wherein the first message is one of a plurality of messages comprising a request for the service, the plurality of messages sent by multicast domain name system.

11. The computer readable storage medium of claim 9, wherein the information associated with the service comprises an address of the service.

12. The computer readable storage medium of claim 9, wherein the information associated with the service comprises an indication of the availability of the service.

13. A computer-implemented method, method comprising:
receiving a first message from a first device on a first local area network, the first message comprising a domain name system-service discovery (DNS-SD) query for a service;
determining that the service is not located on the first local area network;
responsive to determining that the service is not located on the first local area network, providing a second message to a server, the second message comprising a DNS-SD query for the service;
receiving, from the DNS-SD server, a third message, the third message comprising a DNS-SD response to the second message; and
forwarding the third message to the first device, the third message being generated by the server and comprising information associated with the requested service indicating that the requested service is discovered elsewhere in a virtual discovery zone,
wherein the third message comprises a DNS resource record that provides sleep characteristics of a device that hosts the requested service, the sleep characteristics comprising a current sleep state, sleep duration, and sleep periodicity, and
wherein the virtual discovery zone is a logical grouping of local area networks with a common DNS-SD service discovery zone that enables service discoveries over services in the logical grouping of local area networks.

14. The computer-implemented method of claim 13, wherein the first message is one of a plurality messages comprising a request for the service, the plurality of messages sent by multicast domain name system.

15. The computer-implemented method of claim 13, wherein the information associated with the service comprises an address of the service.

16. The computer-implemented method of claim 13, wherein the information associated with the service comprises an indication of the availability of the service.

17. The computer-implemented method of claim 13, wherein the server is located on a wide area network.

18. The computer-implemented method of claim 13, wherein the service is an infrastructure as a service, IAAS.

19. The computer-implemented method of claim 13, further operations comprising providing the information associated with the service to a client device, the client device indicative of being a requester of the service via the first message.

20. The computer-implemented method of claim 13, wherein the determining that the service is not located on the first local area network is based on query of a constrained application protocol, CoAP, resource directory.

* * * * *